(12) United States Patent
Hamano

(10) Patent No.: US 6,650,475 B1
(45) Date of Patent: Nov. 18, 2003

(54) VARIABLE POWER OPTICAL SYSTEM AND IMAGE PICK-UP APPARATUS HAVING THE SAME

(75) Inventor: Hiroyuki Hamano, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/688,700

(22) Filed: Oct. 17, 2000

(30) Foreign Application Priority Data

Oct. 20, 1999 (JP) .......................................... 11-298131

(51) Int. Cl.⁷ ........................ G02B 27/64; G02B 15/14

(52) U.S. Cl. ...................... 359/557; 359/554; 359/687

(58) Field of Search ................................ 359/554–557, 359/676–677, 683–684, 686–687

(56) References Cited

U.S. PATENT DOCUMENTS

| | | | | |
|---|---|---|---|---|
| 4,634,236 A | * | 1/1987 | Masumoto ................... | 359/684 |
| 4,832,471 A | | 5/1989 | Hamano ...................... | 350/427 |
| 4,927,250 A | | 5/1990 | Suda .......................... | 359/557 |
| 4,934,796 A | | 6/1990 | Sugiura et al. .............. | 350/427 |
| 4,988,174 A | | 1/1991 | Horiuchi et al. ............. | 350/427 |
| 4,998,809 A | | 3/1991 | Tsuji et al. .................. | 350/500 |
| 5,009,492 A | | 4/1991 | Hamano ...................... | 350/427 |
| 5,039,211 A | | 8/1991 | Maruyama ................... | 359/557 |
| 5,050,972 A | | 9/1991 | Mukaiya et al. ............. | 359/683 |
| 5,134,524 A | | 7/1992 | Hamano et al. ............. | 359/687 |
| 5,138,492 A | | 8/1992 | Hamano et al. ............. | 359/684 |
| 5,260,834 A | * | 11/1993 | Shibata et al. | |
| 5,270,857 A | | 12/1993 | Oizumi et al. ............... | 359/554 |
| 5,299,064 A | | 3/1994 | Hamano et al. ............. | 359/684 |
| 5,347,399 A | * | 9/1994 | Yoneyama et al. | |
| 5,430,576 A | | 7/1995 | Hamano ...................... | 359/684 |
| 5,521,758 A | | 5/1996 | Hamano ...................... | 359/557 |
| 5,546,230 A | | 8/1996 | Sato et al. ................... | 359/684 |
| 5,579,171 A | * | 11/1996 | Suzuki et al. | |
| 5,585,966 A | | 12/1996 | Suzuki ........................ | 359/557 |
| 5,600,490 A | | 2/1997 | Sugawara et al. .......... | 359/690 |
| 5,630,181 A | * | 5/1997 | Ohtake ........................ | 396/72 |
| 5,638,216 A | | 6/1997 | Horiuchi et al. ............. | 359/683 |
| 5,644,433 A | * | 7/1997 | Ikari ........................... | 359/687 |

(List continued on next page.)

FOREIGN PATENT DOCUMENTS

| | | |
|---|---|---|
| JP | 56-21133 | 5/1981 |
| JP | 61-223819 | 10/1986 |
| JP | 1-116619 | 5/1989 |
| JP | 2-124521 | 5/1990 |
| JP | 7-128619 | 5/1995 |
| JP | 7-199124 | 8/1995 |
| JP | 10-62687 | 3/1998 |

Primary Examiner—Thong Nguyen
(74) Attorney, Agent, or Firm—Fitzpatrick, Cella, Harper & Scinto

(57) ABSTRACT

A variable power optical system includes, from an object in order, a first lens group having a positive refracting power and consisting of a positive singlet lens or the combination of one positive lens and one negative lens, a second lens group having a negative refracting power, a third lens group having a positive refracting power, and a fourth lens group having a positive refracting power, wherein at least the second lens group and the third lens group are moved during a variation in magnification and an image is displaced by shifting the entire second lens group or the entire third lens group so as to have a component in a direction orthogonal to the optical axis. Also, a variable power optical system comprises, from an object in order, a first lens group having a positive refracting power, a second lens group having a negative refracting power, a third lens group having a positive refracting power, and a fourth lens group having a positive refracting power, wherein the first lens group, the second lens group, and the third lens group are moved during a variation in magnification and an image is displaced by shifting the entire third lens group so as to have a component in a direction orthogonal to the optical axis.

16 Claims, 16 Drawing Sheets

U.S. PATENT DOCUMENTS

| | | | |
|---|---|---|---|
| 5,677,792 A | 10/1997 | Hamano | 359/557 |
| 5,694,244 A * | 12/1997 | Abe et al. | |
| 5,751,496 A | 5/1998 | Hamano | 359/677 |
| 5,771,123 A | 6/1998 | Hamano | 359/557 |
| 5,774,275 A | 6/1998 | Hamano | 359/687 |
| 5,818,646 A | 10/1998 | Hamano | 359/684 |
| 5,859,729 A * | 1/1999 | Misaka | |
| 5,905,530 A | 5/1999 | Yokota et al. | 348/240 |
| 5,933,283 A | 8/1999 | Hamano | 359/687 |
| 5,963,378 A | 10/1999 | Tochigi et al. | 359/687 |
| 6,016,228 A | 1/2000 | Uzawa | 359/687 |

\* cited by examiner

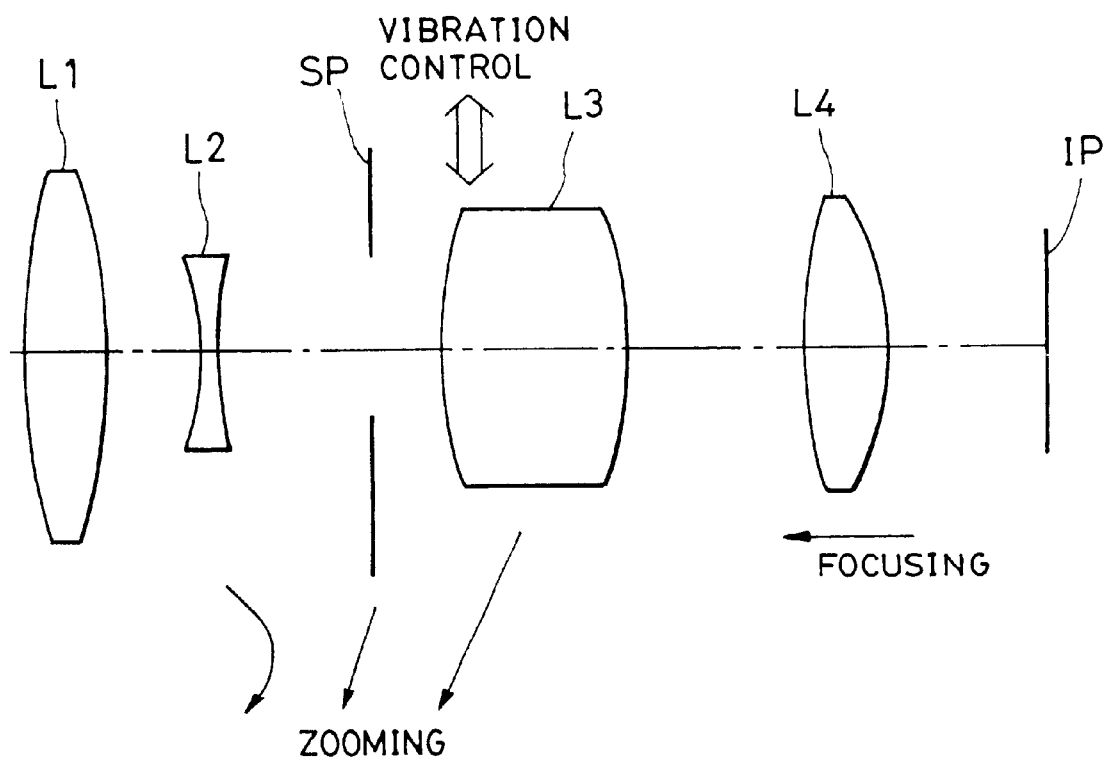

CAMERA SHAKING STATE

LENS SHIFTING

VIBRATION CONTROL STATE

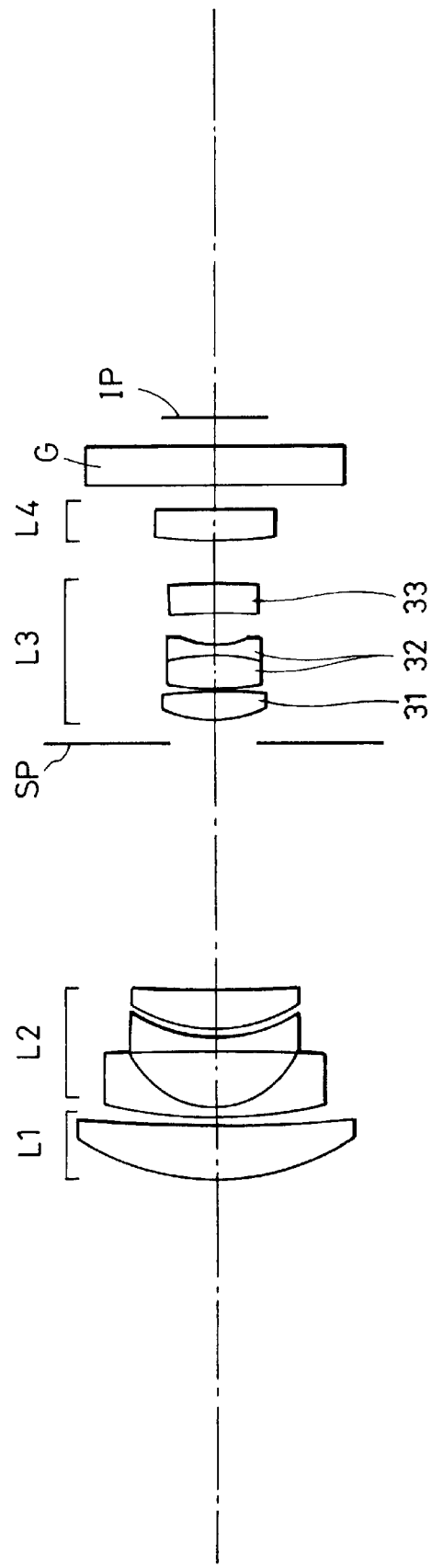

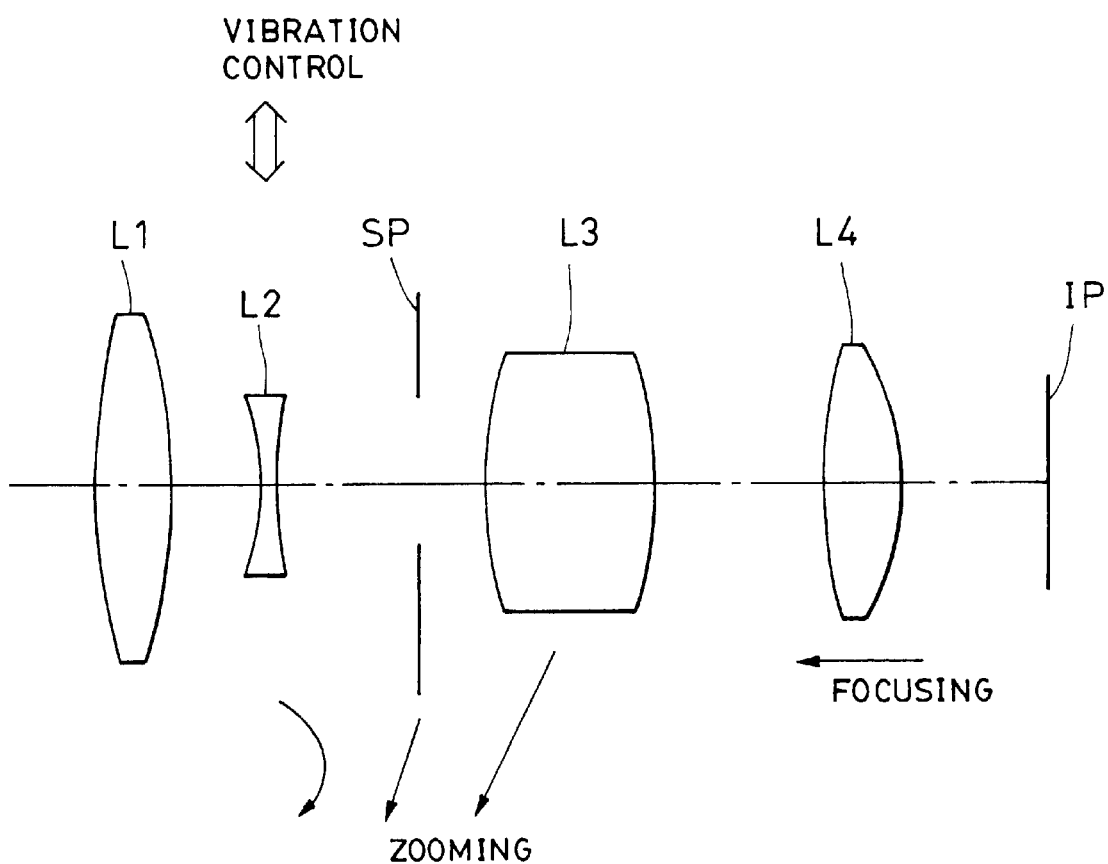

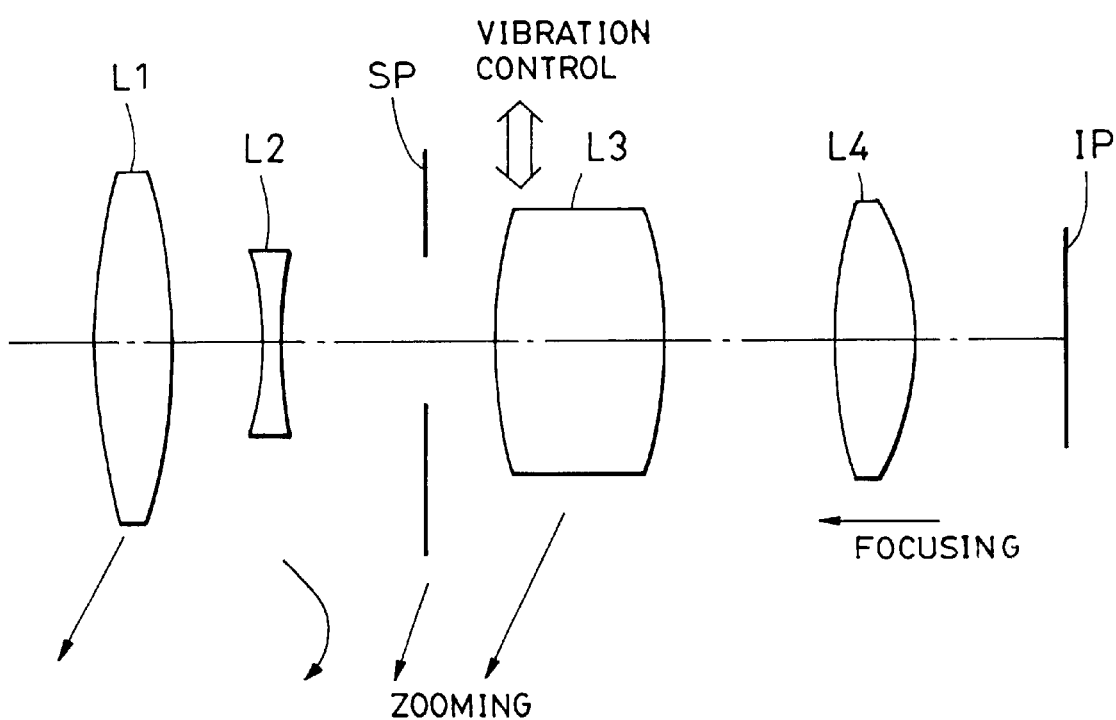

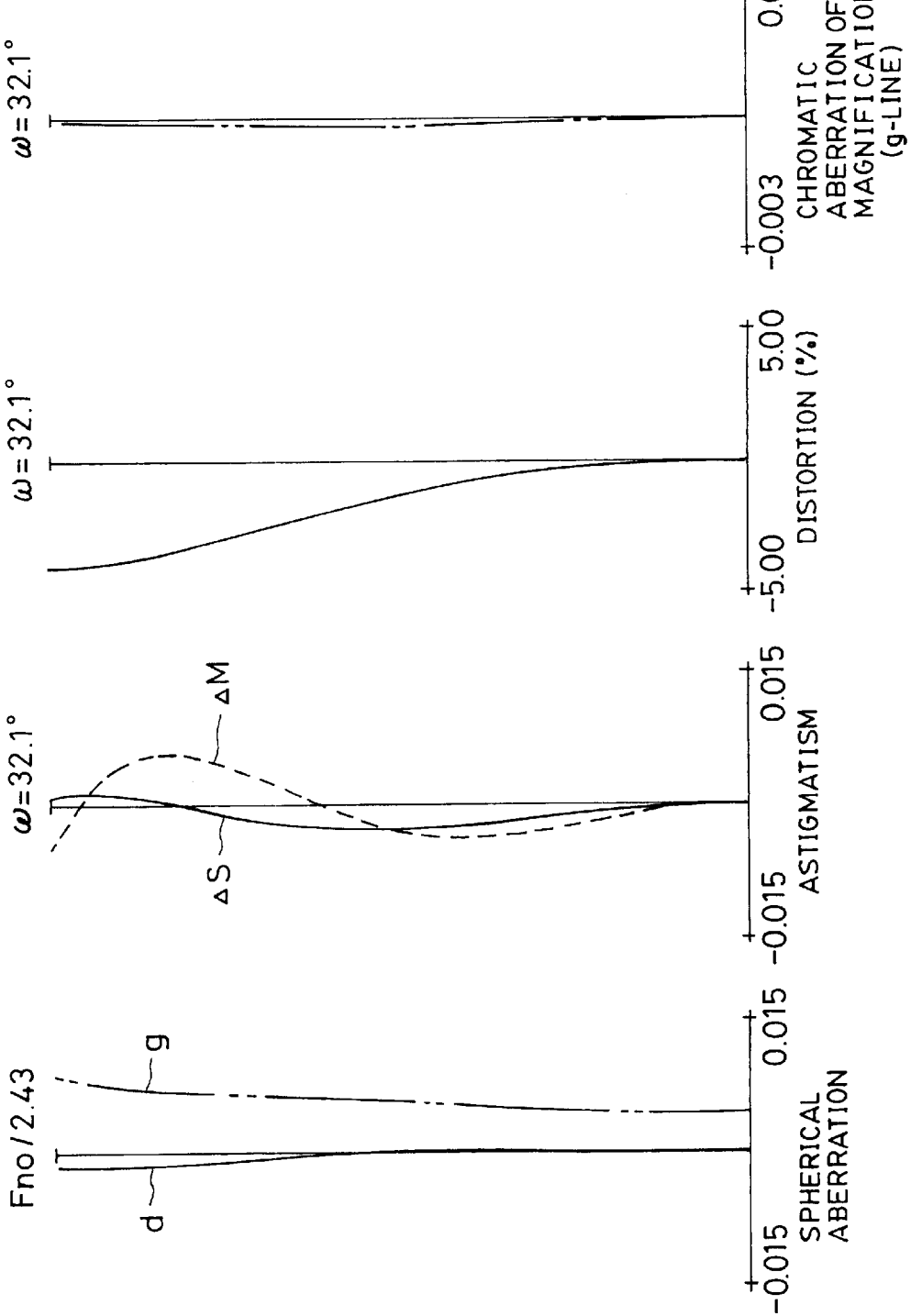

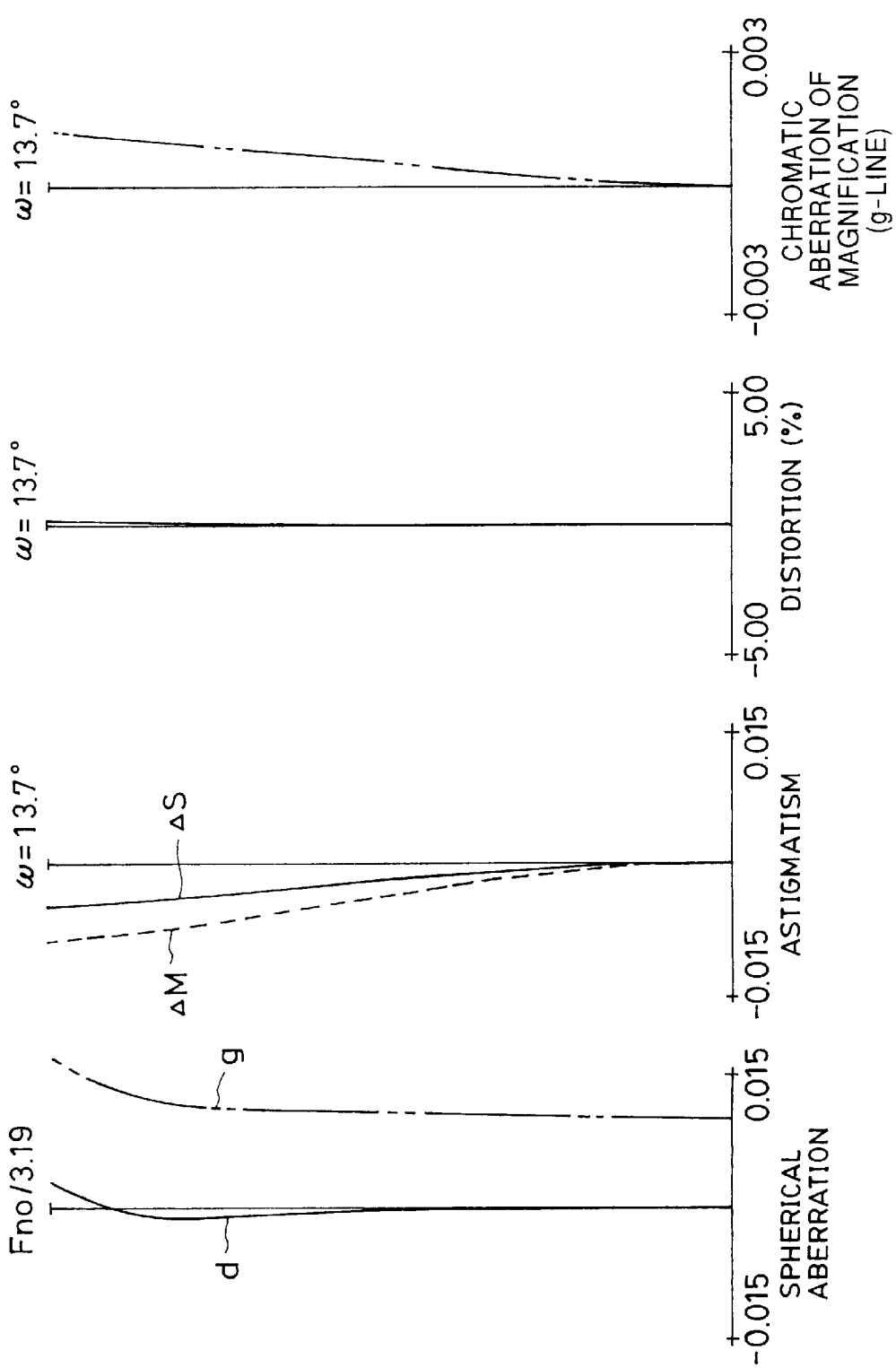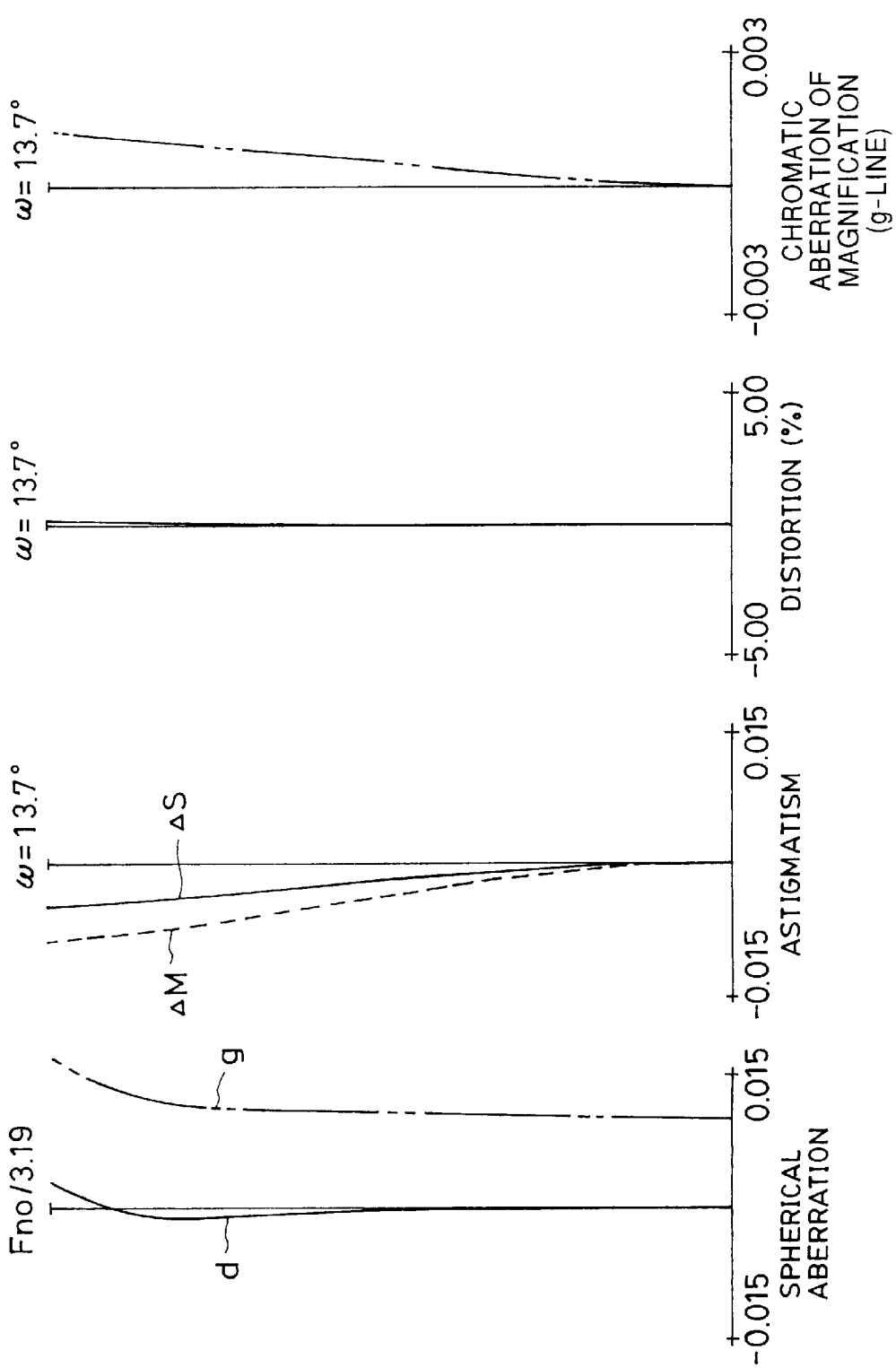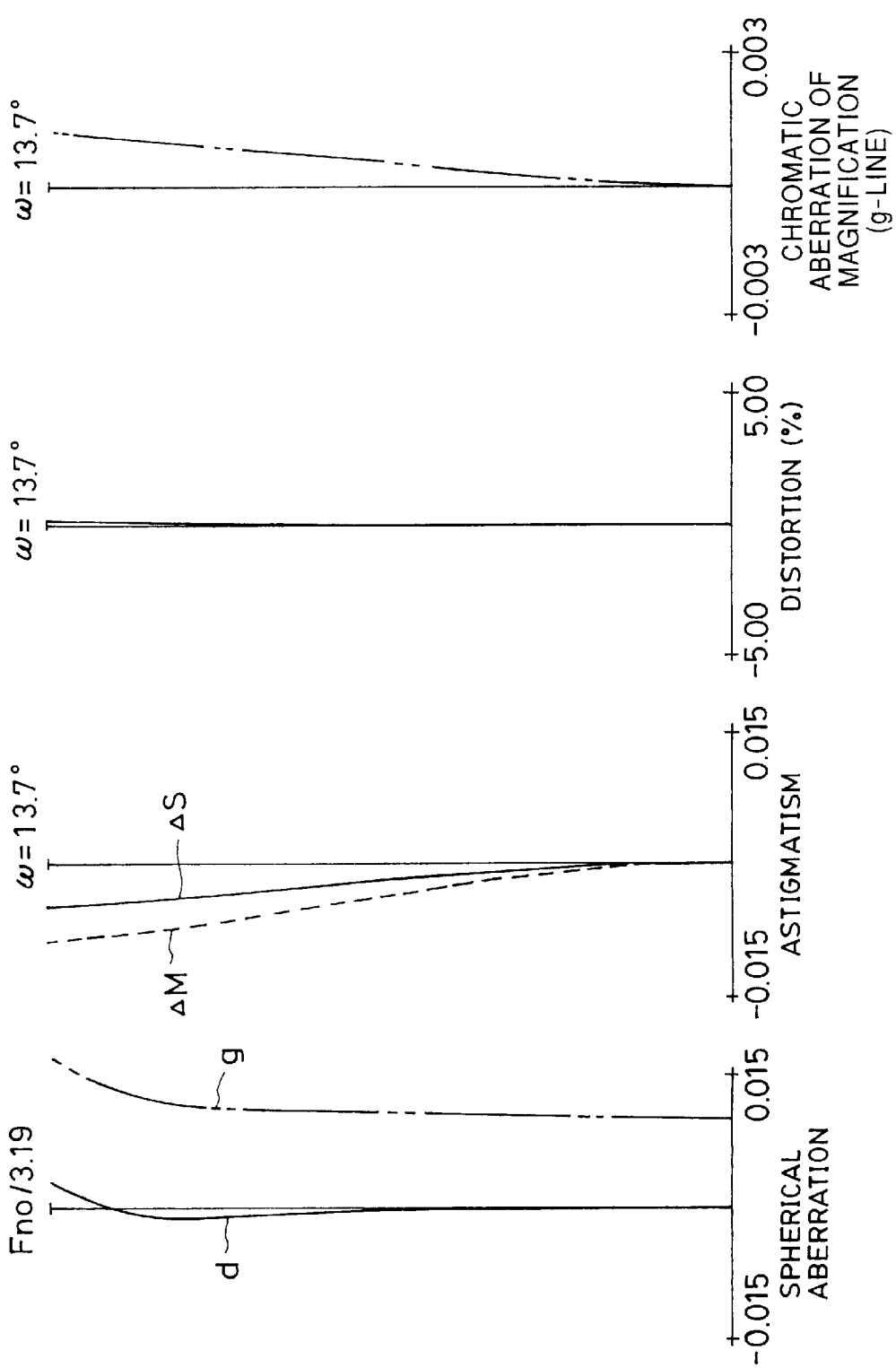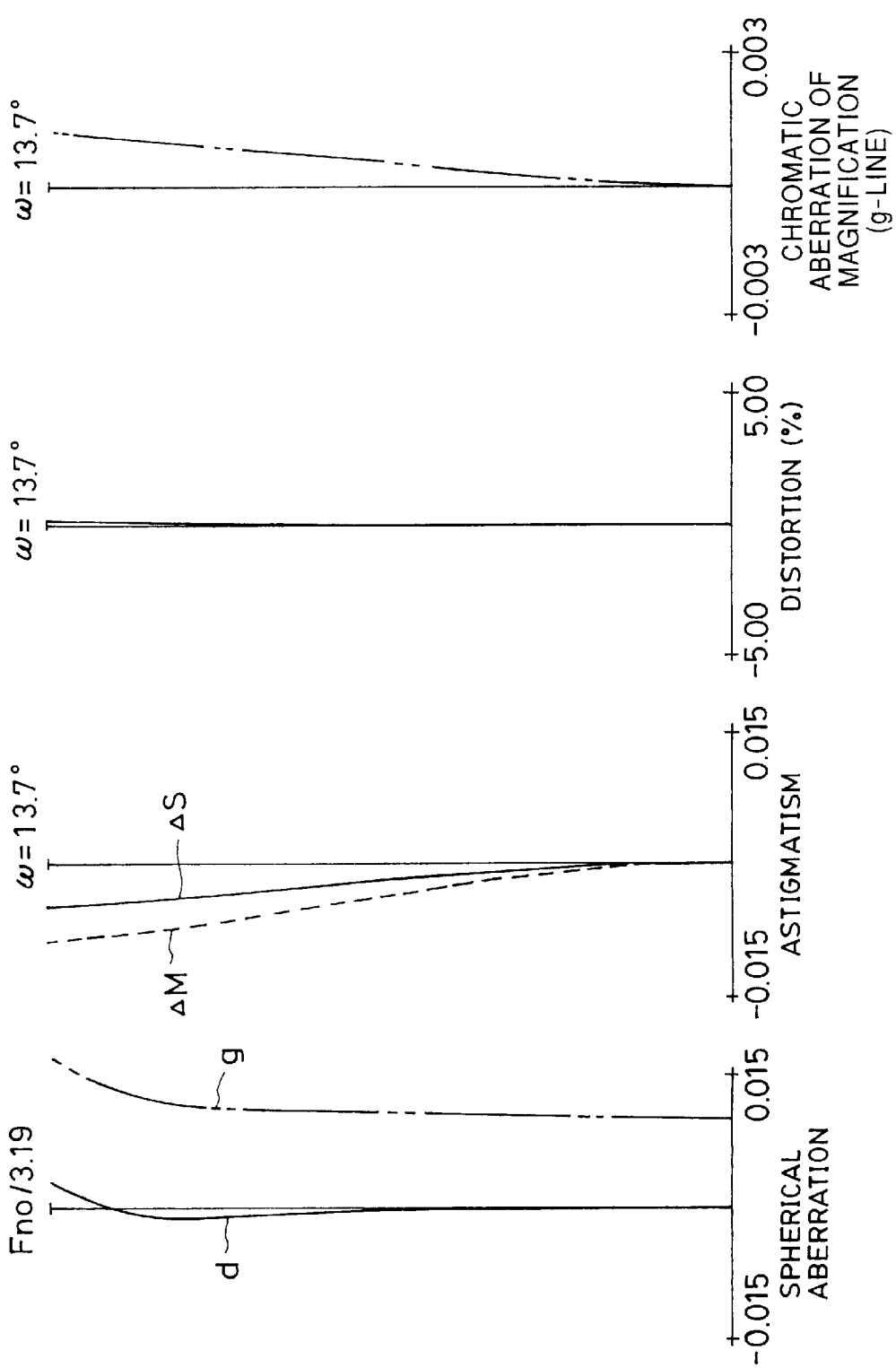

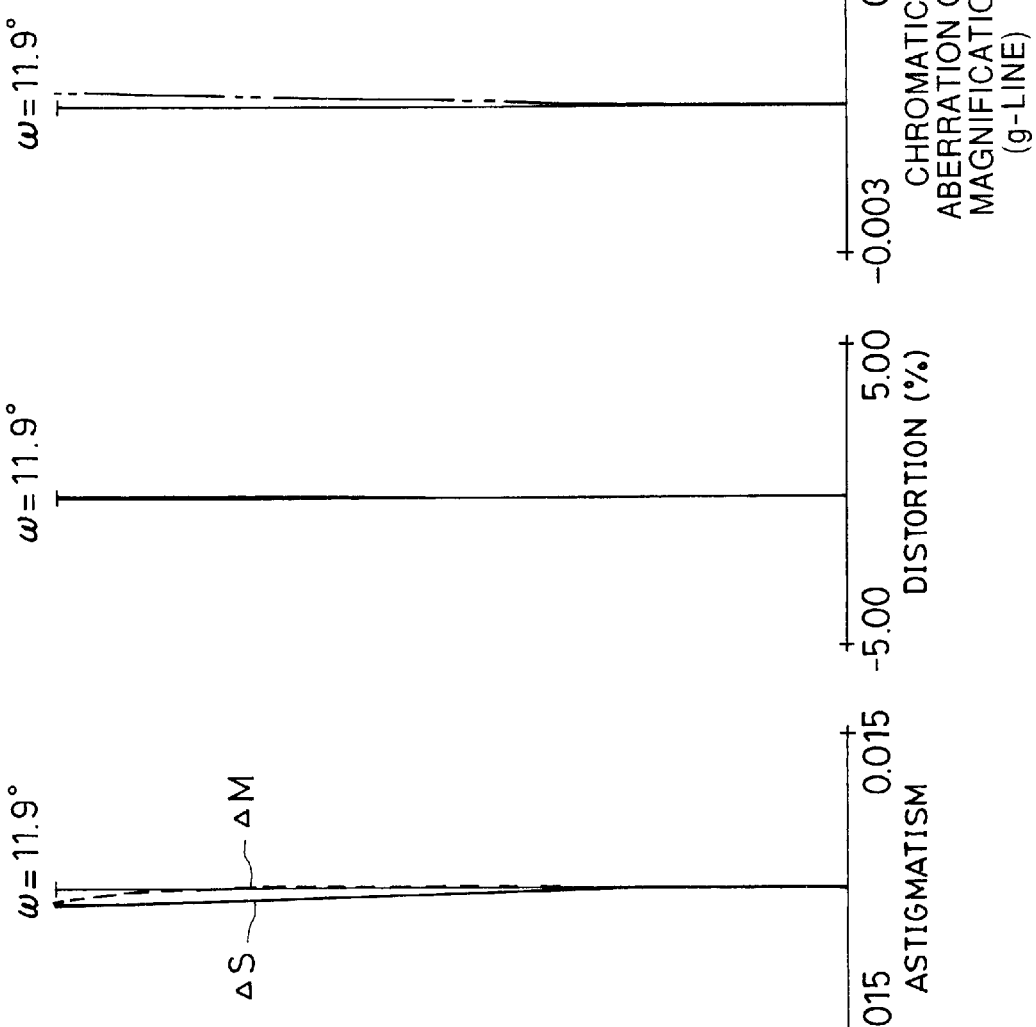

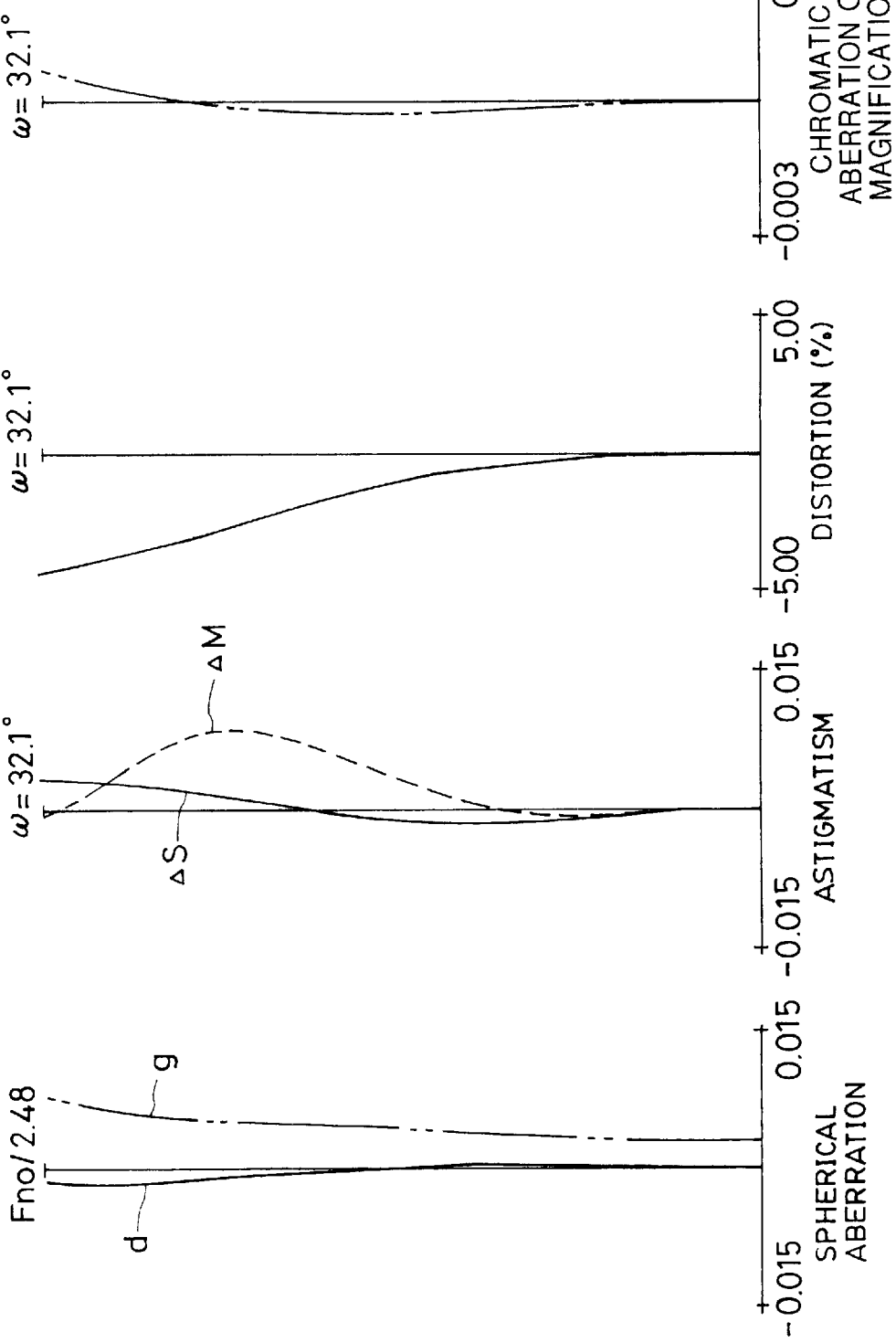

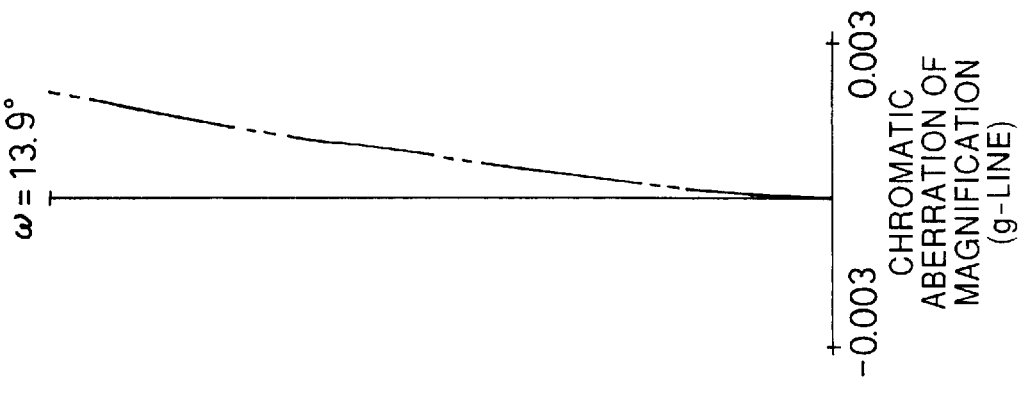
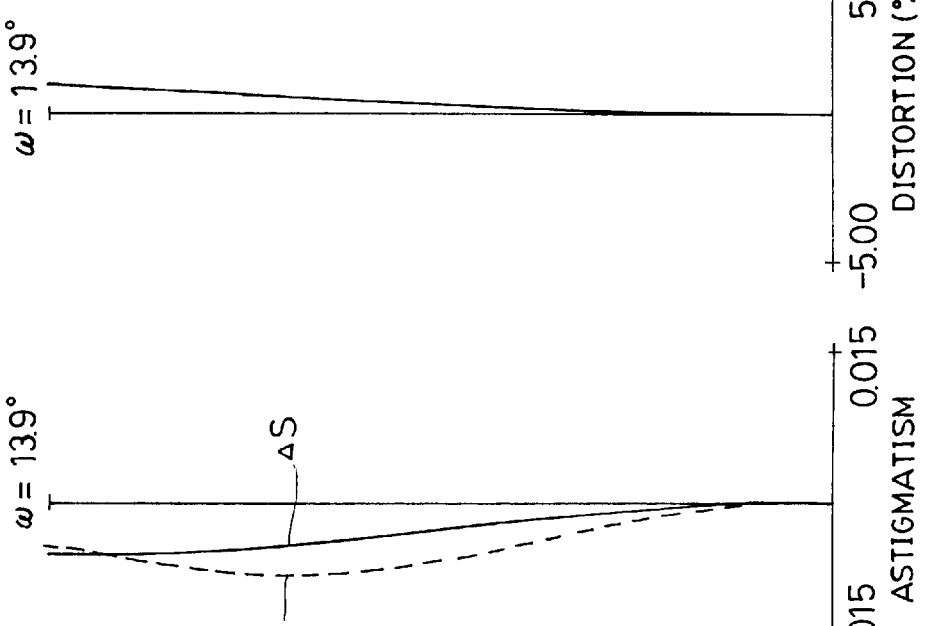
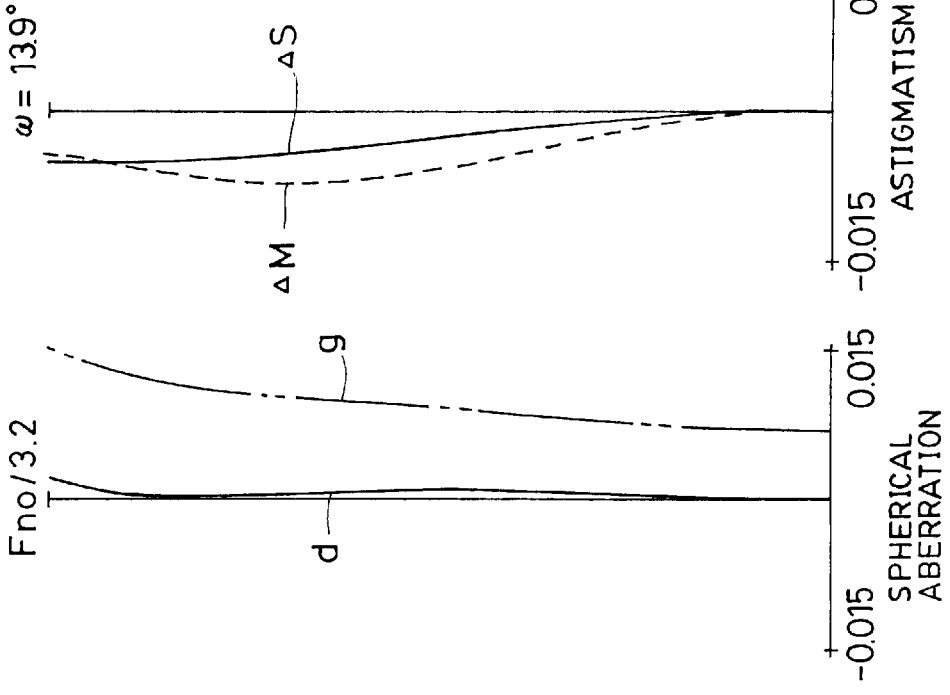

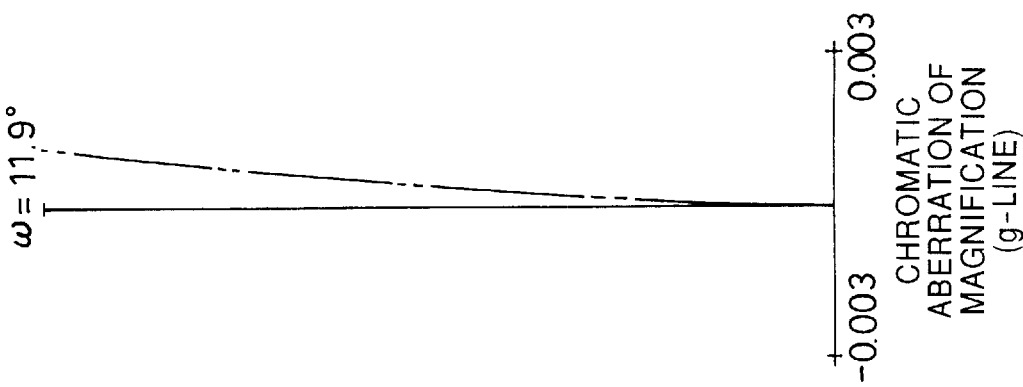
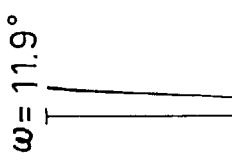
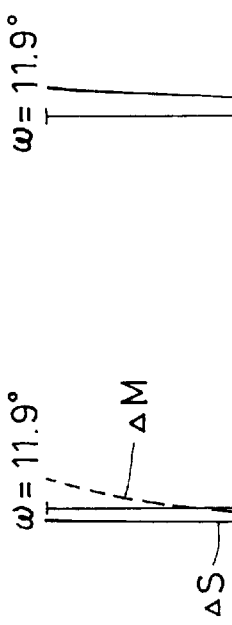
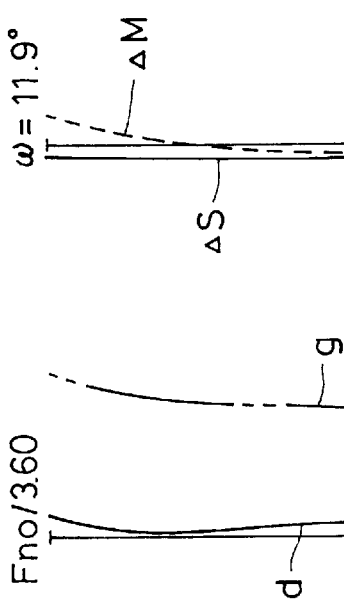

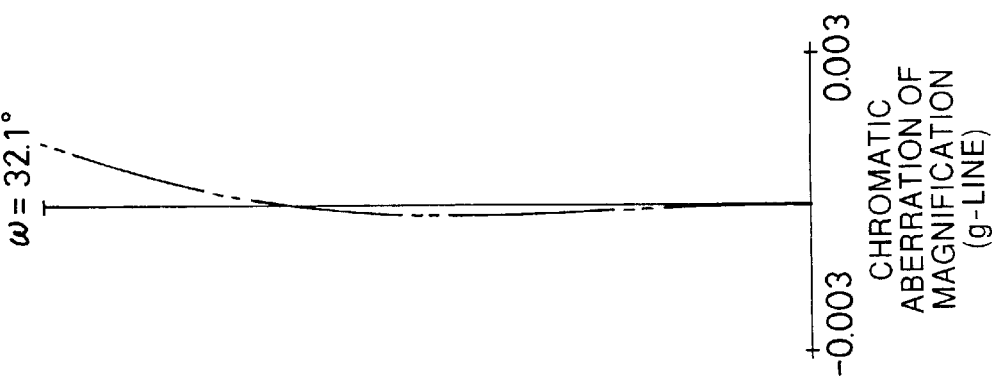
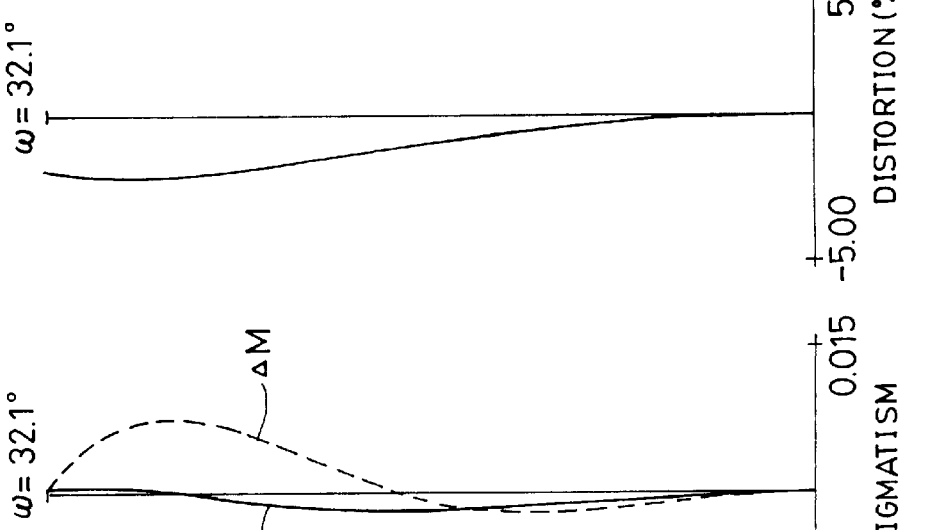
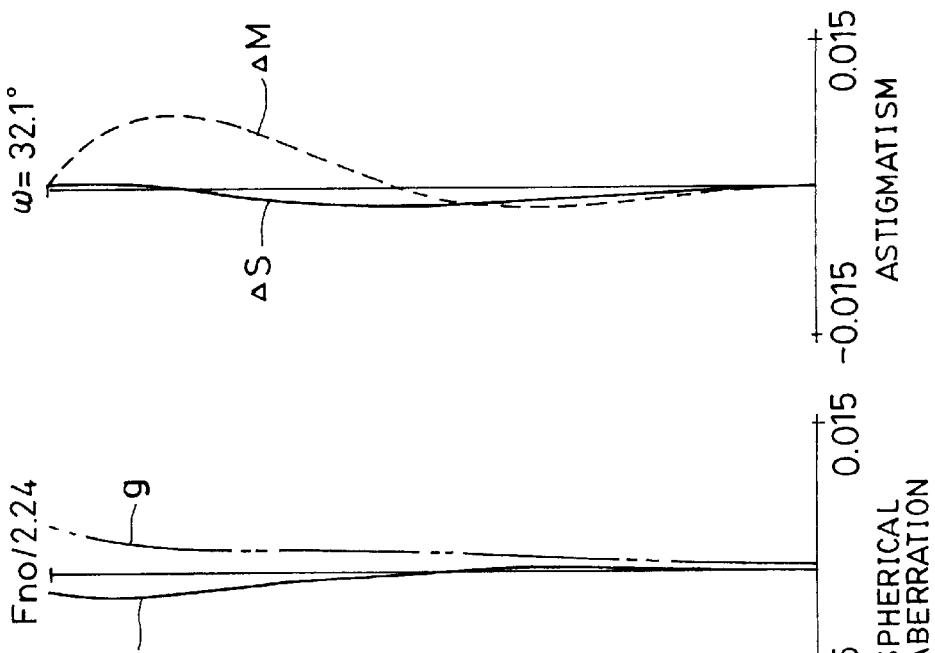

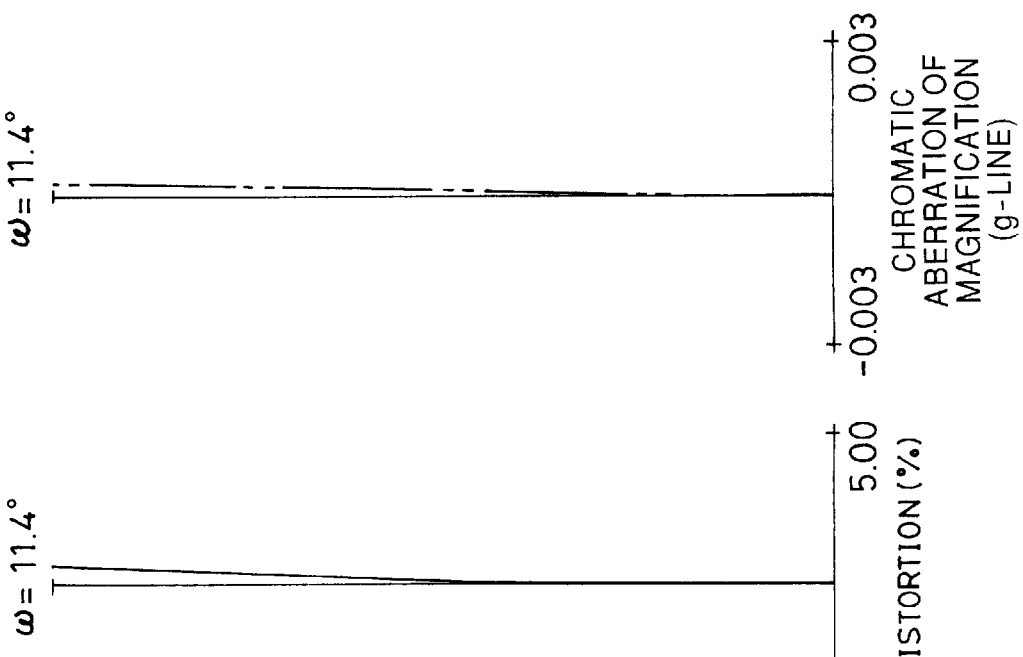
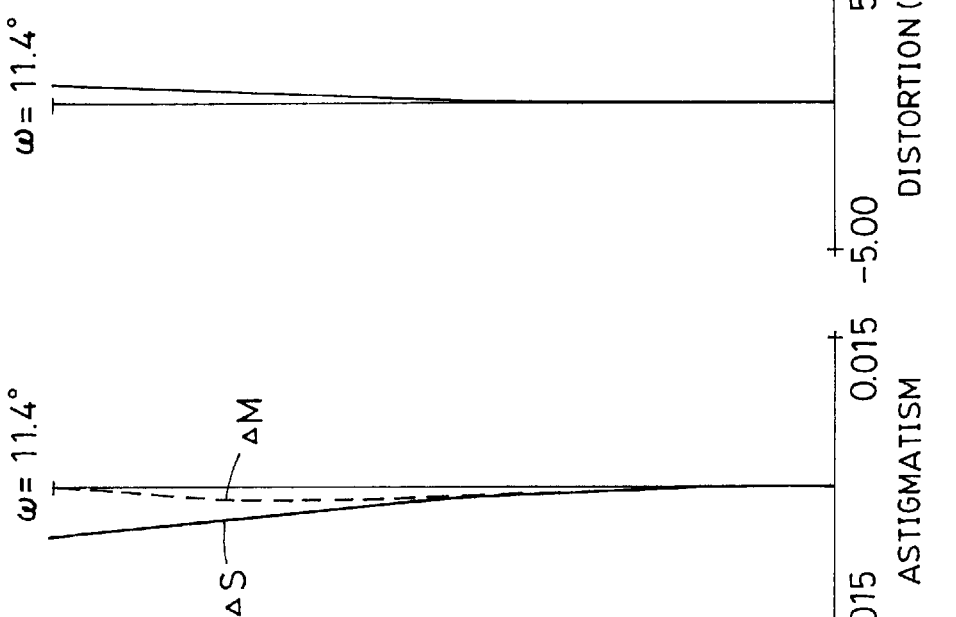
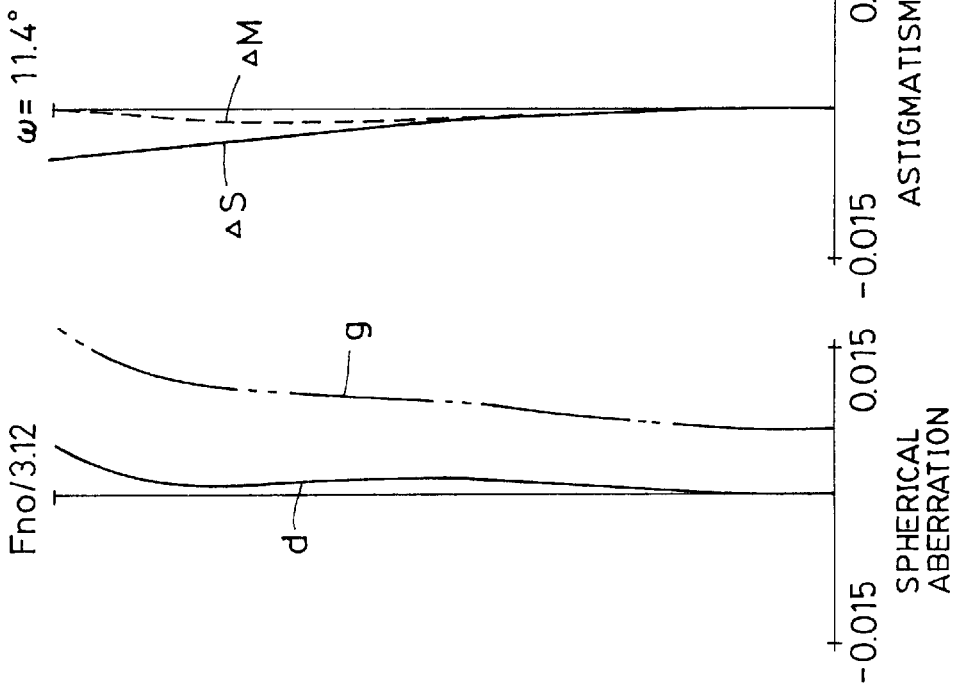

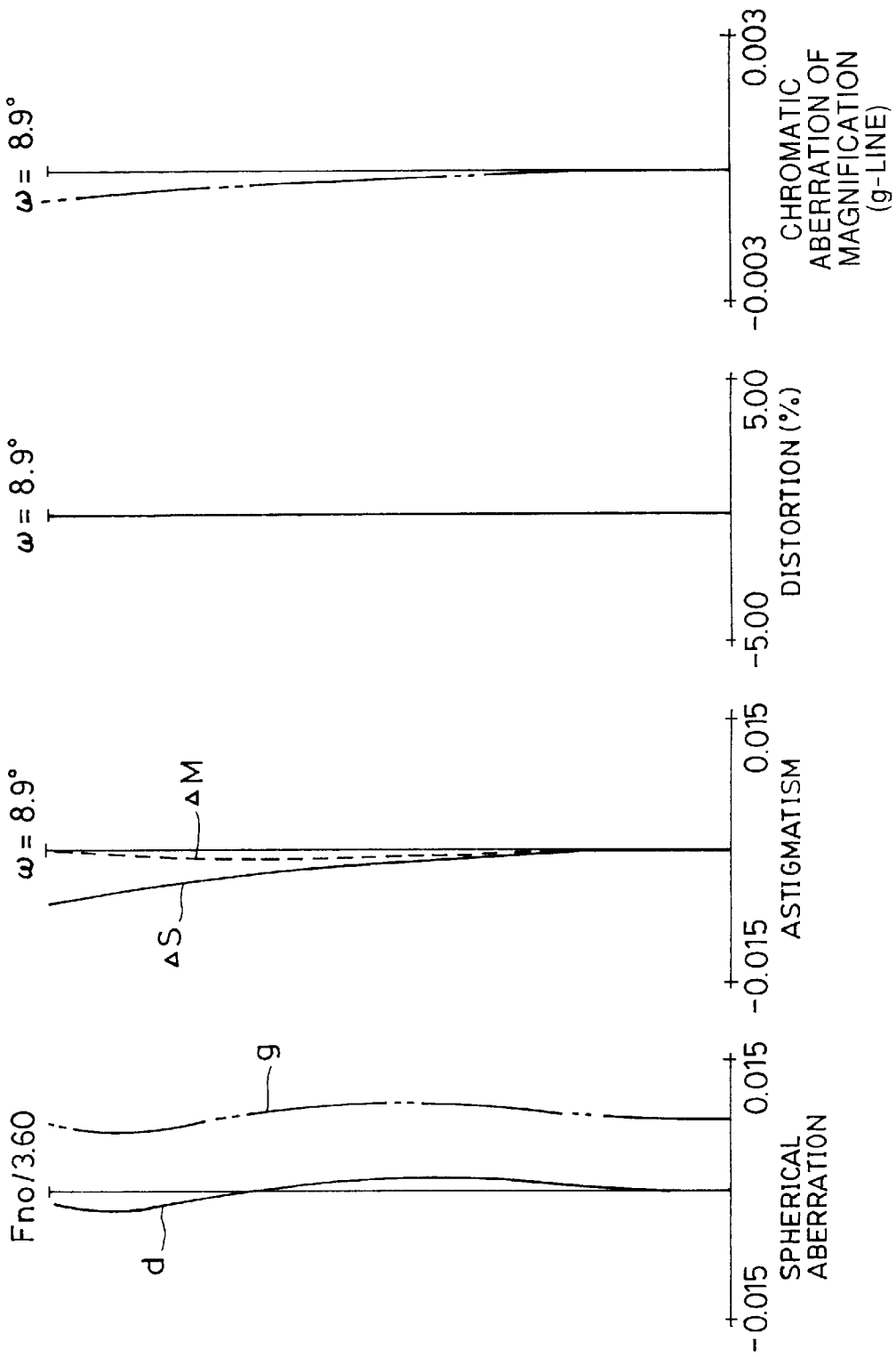

VARIABLE POWER OPTICAL SYSTEM AND IMAGE PICK-UP APPARATUS HAVING THE SAME

BACKGROUND OF THE INVENTION

1. Field of the Invention

The present invention relates to variable power optical systems having a vibration control function and image pick-up apparatuses using the system, and in particular relates to an image pick-up apparatus, such as a video camera, a camera for silver halide photography, an electronic still-camera, and a digital camera, and a variable power optical system having a vibration control function suitably used for the apparatus, wherein when the variable power optical system is vibrated (tilted), image blurring is optically corrected by shifting a part of lens groups of the variable power optical system in a direction orthogonal to the optical axis so as to obtain still images.

2. Description of the Related Art

When a picture is taken from a running mobile unit, such as a vehicle and an aircraft, vibration is transmitted to a photo-shooting system to cause camera shake, thereby generating image blurring.

Hitherto, various vibration control optical systems having the function of preventing image blurring have been proposed.

For example, in Japanese Patent Laid-Open No. 56-21133, image stability is promoted by shifting a part of optical members in a direction for canceling image vibratory displacement due to vibration in accordance with an output signal from detecting means for detecting vibrating conditions in an optical apparatus. In Japanese Patent Laid-Open No. 61-223819, in an image pick-up system in which a prism having a variable apex angle is placed in the closest position to an object, image stability is promoted by changing the apex angle of the prism having the variable apex angle.

In Japanese Patent Laid-Open No. 1-116619 and Japanese Patent Laid-Open No. 2-124521, a still image is obtained by vibrating a part of lens groups in an image pick-up system in a direction orthogonal to the optical axis in accordance with a signal obtained by detecting the vibration of the image pick-up system by utilizing an acceleration sensor, etc.

In Japanese Patent Laid-Open No. 7-128619, a variable power optical system comprises four lens-groups of, in order from an object, a first group having a positive refracting power that is fixed during a variation in magnification and in-focusing, a second group having a negative refracting power having a magnification varying function, an iris, a third group having a positive refracting power, and a fourth group having a positive refracting power having a function of correcting changes in an image plane due to the variable power and in-focussing function as well, wherein the third group comprises two lens-groups of a thirty-first group having a negative refracting power and a thirty-second group having a positive refracting power, and the image blurring produced when the variable power optical system is vibrated is corrected by shifting the thirty-second group in a direction orthogonal to the optical axis.

In Japanese Patent Laid-Open No. 7-199124, a variable power optical system formed of four lens-groups having a positive, a negative, a positive, and a positive refracting power, respectively, controls vibration by vibrating the entire third group.

On the other hand, Japanese Patent Laid-Open No. 10-62687 proposes a zoom lens formed of four lens-groups respectively having a positive, a negative, a positive, and a positive refracting power, wherein high performance is achieved while the entire length of the lens is reduced by a variation in magnification the second and the third lens-group and by forming the first lens-group of positive singlet lenses.

In general, in a method for obtaining still images wherein image blurring is eliminated by placing a vibration control optical system in front of an image pick-up system and by vibrating a part of operating lens-groups in the vibration control optical system, there has been the problem that the entire size of the apparatus is increased and the shifting mechanism of the operating lens-groups is complicated.

In a vibration control optical system utilizing a prism having a variable apex angle, there has been the problem that chromatic aberration having a decentering magnification is increased during vibration control when the focal length is large, in particular.

On the other hand, in an optical system wherein vibration control is performed by decentering in parallel a part of operating lens-groups of an image pick-up system in a direction orthogonal to the optical axis, there has been the problem that a space for shifting lenses is needed and decentering aberration during vibration control is increased, even through there is the advantage of not requiring an additional optical system for vibration control.

In a variable power optical system formed of four lens-groups respectively having a positive, a negative, a positive, and a positive refracting power, when vibration control is performed by shifting the entire third lens-group in a direction orthogonal to the optical axis, there has been the problem that when the third lens-group is formed to be of a telephoto type having a positive lens and a negative meniscus lens so as to reduce the entire length, decentering aberration such as decentering coma or the decentering distortion on an image plane is produced therein, thereby causing the image quality to deteriorate.

Furthermore, in the conventional zoom lenses described above, although the zoom lens having a zooming ratio of eight or more is matched to a video camera, etc., it is insufficient in view of correcting aberration for use as an electronic still camera having an image pick-up element equivalent to one million pixels.

SUMMARY OF THE INVENTION

Accordingly, it is an object of the present invention to provide a variable power optical system and an image pick-up apparatus using the system wherein the image blurring produced when the variable power optical system is vibrated (tilted) is corrected by shifting a comparatively small-sized and lightweight lens group forming a part of the variable power optical system in a direction orthogonal to the optical axis, and wherein the system has a vibration control function having properly corrected decentering aberration produced when the lens group is decentered and sufficiently matching to an electronic still camera having one million pixels or more, for example, while a miniaturized apparatus and a simplified mechanism are obtained by properly forming the lens group for correcting the blurring.

To this end, in accordance with a first aspect, the present invention relates to a variable power optical system comprising, in order from an object side a first lens group having a positive refracting power and consisting of a positive singlet lens or the combination of one positive lens and one negative lens, a second lens group having a negative refracting power, a third lens group having a positive refracting power, and a fourth lens group having a positive refracting power. At least the second lens group and the third lens group are moved during a variation in magnification, and an image is displaced by shifting any one of the entire second lens group and the entire third lens group so as to have a component in a direction orthogonal to an optical axis of the optical system.

Preferably, when the image is displaced by shifting the entire third lens group so as to have a component in the direction orthogonal to the optical axis, the optical system satisfies the condition (1) discussed below. Further, when the image is displaced by shifting the entire second lens group so as to have a component in a direction orthogonal to the optical axis, the optical system satisfies the conditions (2) and (3) discussed below. Moreover, when the image is displaced by shifting the entire second lens group so as to have a component in a direction orthogonal to the optical axis, the optical system satisfies the condition (4) discussed below.

The third lens group preferably comprises a plurality of positive lenses and one negative lens having a concave surface facing the image side. More specifically, the third lens group may preferably consist of, in order from the object side, a positive lens, bonded lenses comprising a positive lens and one negative lens having a concave surface facing the image side, and a positive lens. Further, the positive lens disposed closest to the object side in the third lens group is an aspherical lens. In addition, the second lens group preferably consists of, in order from the object side, a negative meniscus lens having a concave surface facing the image side, a negative lens, and a positive lens having a convex surface facing the object side. Also, the first lens group consists of a positive singlet lens and satisfies the conditions (5) and (6) discussed below.

According to yet another aspect, the present invention that achieves at least one of these objectives relates a variable power optical system comprising, in order from an object side a first lens group having a positive refracting power, a second lens group having a negative refracting power, a third lens group having a positive refracting power, and a fourth lens group having a positive refracting power. The first lens group, the second lens group, and the third lens group are moved during a variation in magnification, and an image is displaced by shifting the entire third lens group so as to have a component in a direction orthogonal to an optical axis of the variable power optical system.

The optical system preferably satisfies the condition (7) discussed below. In addition, the second lens group preferably consists of, in order from the object side, a negative meniscus lens having a concave surface facing the image side, a negative lens, and a positive lens having a convex surface facing the object side.

According to another aspect, the present invention that achieves at least one of these objectives relates to an image pick-up apparatus comprising a variable power optical system, a casing for holding the variable power optical system, and an image pickup element supported by the casing and positioned to receive light from the variable power optical system. The optical system comprises, in order from an object side a first lens group having a positive refracting power and consisting of a positive singlet lens or the combination of one positive lens and one negative lens, a second lens group having a negative refracting power, a third lens group having a positive refracting power, and a fourth lens group having a positive refracting power. At least the second lens group and the third lens group are moved during a variation in magnification, and an image is displaced by shifting any one of the entire second lens group and the entire third lens group so as to have a component in a direction orthogonal to an optical axis of the optical system.

According to another aspect, the present invention that achieves at least one of these objectives relates to an image pick-up apparatus comprising a variable power optical system, a casing for holding the variable power optical system, and an image pickup element supported by the casing and positioned to receive light from the variable power optical system. The optical system comprises, in order from an object side a first lens group having a positive refracting power, a second lens group having a negative refracting power, a third lens group having a positive refracting power, and a fourth lens group having a positive refracting power. The first lens group, the second lens group, and the third lens group are moved during a variation in magnification, and an image is displaced by shifting the entire third lens group so as to have a component in a direction orthogonal to an optical axis of the variable power optical system.

According to another aspect, the present invention that achieves at least one of these objectives relates to a method of compensating for image blurring that occurs when a variable power optical system is tilted. The variable power optical system comprises a first lens group having a positive refracting power and consisting of a positive singlet lens or the combination of one positive lens and one negative lens, a second lens group having a negative refracting power, a third lens group having a positive refracting power, and a fourth lens group having a positive refracting power. The method comprises the steps of moving at least the second lens group and the third lens group during a variation in magnification and displacing an image by shifting any one of the entire second lens group and the entire third lens group so as to have a component in a direction orthogonal to an optical axis of the variable power optical system.

The shifting step preferably comprises the step of satisfying condition (1) when the image is displaced by shifting the entire third lens group so as to have a component in the direction orthogonal to the optical axis, wherein the magnification at a telephoto end of the third lens group is B3t and the magnification at the telephoto end of a lens group disposed toward the image from the third lens group is Brt.

The shifting step can also comprise the step of satisfying conditions (2) and (3) when the image is displaced by shifting the entire second lens group so as to have a component in a direction orthogonal to the optical axis. Moreover, the shifting step can comprise the step of satisfying condition (4) when the image is displaced by shifting the entire second lens group so as to have a component in a direction orthogonal to the optical axis, wherein the magnification at a telephoto end of the second lens group is B2t and the magnification at the telephoto end of a lens group disposed toward the image from the second lens group is Brt.

The third lens group preferably comprises a plurality of positive lenses and one negative lens having a concave surface facing the image side, and more specifically consists of, in order from the object side, a positive lens, bonded lenses comprising a positive lens and one negative lens having a concave surface facing the image side, and a positive lens. In addition, the positive lens disposed closest to the object side in the third lens group is an aspherical lens. Further, the second lens group preferably consists of, in order from the object side, a negative meniscus lens having a concave surface facing the image side, a negative lens, and a positive lens having a convex surface facing the object side. Also, the first lens group consists of a positive singlet lens and satisfies conditions (5) and (6).

According to another aspect, the present invention that achieves at least one of these objectives relates to a method of compensating for image blurring that occurs when a variable power optical system is tilted. The variable power optical system comprises, in order from the object side, a first lens group having a positive refracting power, a second lens group having a negative refracting power, a third lens group having a positive refracting power, and a fourth lens group having a positive refracting power. The method comprises the steps of moving the first lens group, the second lens group, and the third lens group during a variation in magnification, and displacing an image by shifting the entire third lens group so as to have a component in a direction orthogonal to an optical axis of the variable power optical system. The optical system preferably satisfies condition (7). And, the second lens group preferably consists of, in order from the object side, a negative meniscus lens having a concave surface facing the image side, a negative lens, and a positive lens having a convex surface facing the object side.

Further objects, features and advantages of the present invention will become apparent from the following description of the preferred embodiments (with reference to the attached drawings).

BRIEF DESCRIPTION OF THE DRAWINGS

FIG. 1 is a schematic diagram of the arrangement of paraxial refracting powers of a variable power optical system according to a first embodiment of the present invention;

FIG. 3 is a sectional view of lenses at a wide-angle end according to a first numerical example according to the present invention;

FIG. 4 is a schematic diagram of the arrangement of paraxial refracting powers of a variable power optical system according to a second embodiment of the present invention;

FIG. 5 is a schematic diagram of the arrangement of paraxial refracting powers of a variable power optical system according to a third embodiment of the present invention;

FIGS. 7A–7D are aberration graphs at the wide-angle end of the first numerical example according to the present invention;

FIGS. 8A–8D are aberration graphs in the intermediate section of the first numerical example according to the present invention;

FIGS. 9A–9D are aberration graphs at a telephoto end of the first numerical example according to the present invention;

FIGS. 10A–10D are aberration graphs at a wide-angle end of a second numerical example according to the present invention;

FIGS. 11A–11D are aberration graphs in the intermediate section of the second numerical example according to the present invention;

FIGS. 12A–12D are aberration graphs at the telephoto end of the second numerical example according to the present invention;

FIGS. 13A–13D are aberration graphs at the wide-angle end of the third numerical example according to the present invention;

FIGS. 14A–14D are aberration graphs in the intermediate section of the third numerical example according to the present invention;

FIGS. 15A–15D are graphs at the telephoto end of the third numerical example according to the present invention.

DESCRIPTION OF THE PREFERRED EMBODIMENTS

Figure 2A:
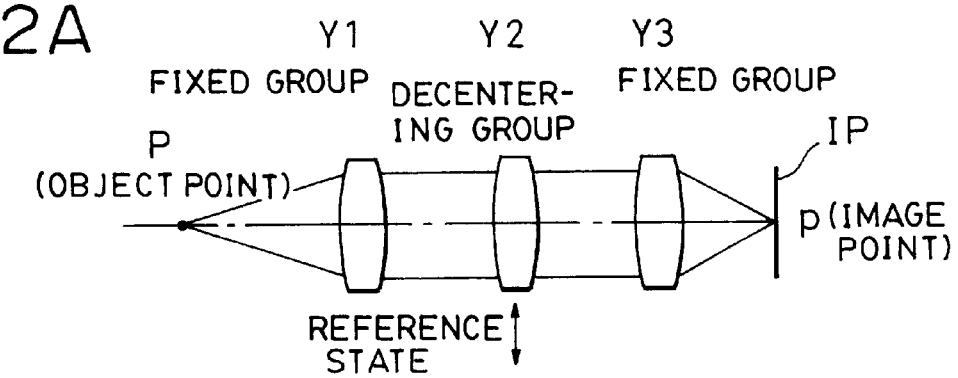
FIGS. 2A–2D are schematic diagrams illustrating an optical principle of a vibration control system according to the present invention.

FIG. 1 is a schematic diagram of the arrangement of paraxial refracting powers of a variable power optical system according to a first embodiment of the present invention. In FIG. 1, the optical system comprises a first lens group L1 having a positive refracting power, a second lens group L2 having a negative refracting power, a third lens group L3 having a positive refracting power, and a fourth lens group L4 having a positive refracting power.

In the first embodiment, the blurring of a captured image (image blurring) produced when the entire optical system is vibrated (tilted) is corrected by shifting the third lens group L3 in a direction orthogonal to the optical axis of the optical system. An iris SP is located in front of the third lens group L3.

In the embodiment, during a variation in magnification from a wide-angle end to a telephoto end, the second lens group L2 and the third lens group L3 are moved along the optical axis, as shown by arrows. A rear focusing system is adopted, in which the fourth lens group L4 is moved along the optical axis for rear focusing. In addition, the first lens group L1 is fixed during a variation in magnification and focusing.

During a variation in magnification from the wide-angle end to the telephoto end, the third lens group L3 is moved toward an object while the second lens group L2 is moved toward an image plane at first and is then moved toward the object at some point during the varying of magnification. The iris SP is moved together with the third lens group L3 toward the object; however, it may be independently moved when desired.

In the first embodiment, focusing from an object at infinity toward an object at a short distance, for example, is performed by moving the fourth lens group L4 forward, as shown in the drawing.

In the first embodiment, the image blurring produced when the entire optical system is vibrated is corrected by shifting the third lens group L3 in a direction orthogonal to the optical axis for vibration control. Thereby, vibration control is performed without adding optical members such as a prism having a variable apex angle and a new lens group for vibration control.

Next, the optical principle of a vibration control system will be described with reference to FIGS. 2A to 2D, in which image blurring is corrected by shifting a lens group in a direction orthogonal to the optical axis in the variable power optical system according to the present invention.

Figure 2B:
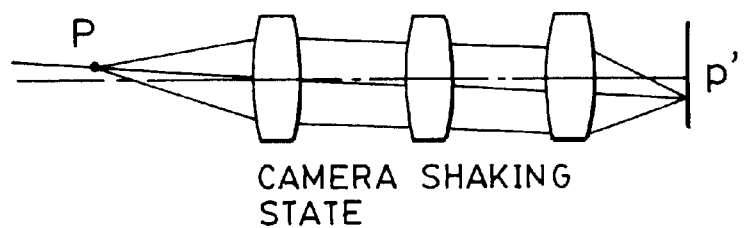

As shown in FIG. 2A, the optical system comprises three groups of a fixed group Y1, a decentering group Y2, and a fixed group Y3, and it is assumed that an object point P located on the optical axis sufficiently separated from the lenses is focused to an image at the center of an image plane IP as an image point p. If the entire optical system including the image plane IP is momentarily tilted by camera shake as shown in FIG. 2B, the object point P also is momentarily moved to the image point p' so as to be blurred.

Figure 2C:
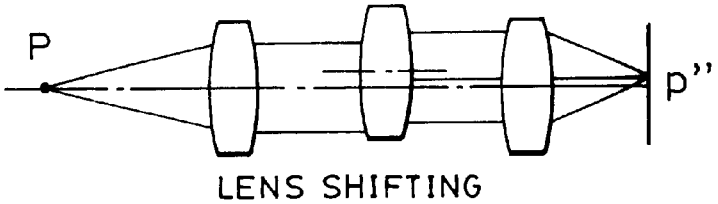
Figure 2D:
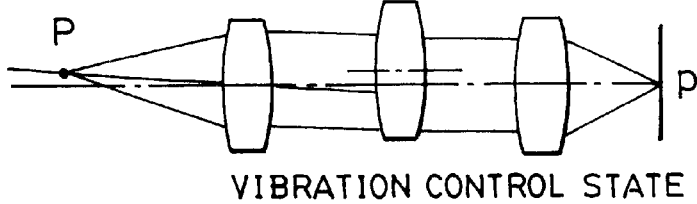

On the other hand, when the decentering group Y2 is shifted in a direction orthogonal to the optical axis, the image point p is moved to the image point p" as shown in FIG. 2C. The displacement and the direction thereof depend on the arrangement of refracting powers and represent the decentering sensitivity of the lens group. Then the blurred image point p' produced by the camera shake is returned to the original image point p by shifting the decentering group Y2 by a proper distance in a direction orthogonal to the optical axis, so that the correction of camera shake, that is vibration control, is performed, as shown in FIG. 2D.

When it is defined that the displacement of the shifted lens group required for correcting the optical axis angle by θ° is Δ, the focal length of the entire optical system is f, and the decentering sensitivity of the shifted group Y2 is TS, Δ is given by the following equation.

$$\Delta = f \cdot \tan(\theta)/TS$$

When the decentering sensitivity of the shifted group TS is excessively large, although the displacement of the shifted group can be smaller, vibration control cannot be properly performed leaving a residual error to be corrected.

In video cameras and digital still cameras in particular, since the image size in the image pick-up element, such as a CCD, is smaller than that of a film for silver halide photography and since the focal length for the same angle of view is smaller, the shifting displacement Δ of the shifting lens group for correcting the same angle is smaller. Therefore, if the mechanical accuracy is of the same order, the residual error on the image plane to be corrected is relatively large.

On the other hand, when the decentering sensitivity TS is excessively small, the displacement of the shifting lens group required for vibration control is large, so that driving means for driving the shifting lens group such as an actuator becomes large.

In the first embodiment according to the present invention, the decentering sensitivity TS of the third lens group is set to be the proper value by properly setting the arrangement of the refracting powers of each lens group, thereby achieving an optical system in which the residual error to be corrected due to mechanical control errors is reduced and also the load required for the driving means such as the actuator is small.

To be specific in the first embodiment, the image blurring produced when the variable power optical system is vibrated is corrected by shifting the entire third lens group in a direction orthogonal to the optical axis, and the variation in magnification is performed by moving at least the second lens group and the third lens group while the first lens group is formed of a positive singlet lens or one positive lens and one negative lens.

FIG. 3 shows a sectional view of an optical system in a first numerical example according to the present invention.

In the first embodiment, the first lens group L1 comprises a positive singlet lens; the second lens group L2 comprises, in order from an object, a negative meniscus lens having a concave surface facing the image side, a negative lens, and a positive lens having a convex surface facing the object; and the third lens group L3 comprises, in order from the object, a positive lens 31, bonded lenses 32 of a positive lens and a negative meniscus lens having a concave surface facing the image side, and a positive lens 33. The positive lens 31 has an aspherical surface facing the object. An iris SP is positioned in front of the third lens group L3. An image plane IP is behind the fourth lens group L4. An optical element G denotes an optical block such as a prism, a faceplate, an infrared absorption filter, and a low-pass filter.

By forming the negative meniscus lens having a concave surface facing the image side in the third lens group, the entire third lens group forms a telephoto structure so as to reduce the space between the principal points of the second and third lens groups, thereby achieving a reduction in the entire length of the lens system.

In the embodiment, while the telephoto structure is maintained to a certain extent by placing the positive lens 33 on the image plane side of the meniscus negative lens 32, distortion is corrected in the third lens group and the decentering distortion produced when vibration control is performed by shifting the third lens group is reduced. Also, in the embodiment, by providing the aspherical surface in the positive lens 31, spherical aberration is restrained in the third lens group and the decentering coma produced when vibration control is performed is reduced.

Also in the first embodiment, by forming a fourth lens group L4 of one positive lens, the load of the actuator for focusing is reduced.

In the first embodiment, the fourth lens group L4 comprises a positive singlet lens, but when a negative lens is added thereto, changes in the chromatic aberrations during the focusing can also be reduced.

In the first embodiment as described above, high level optical performance is achieved over the entire range of variation of magnification and object distance in the reference state and the vibration control state.

In the variable power optical system according to the first embodiment and having the vibration control function for obtaining more excellent optical performance, it is preferable that at least one of the following conditions be satisfied.

(A-1) When the magnification at the telephoto end of the third lens group and the lens groups located toward the image from the third lens group are respectively defined as B3t and Brt, the following condition is satisfied.

$$0.5 < |(1-B3t) \cdot Brt| < 3 \tag{1}$$

When the magnification at the telephoto end of the third lens group and the lens groups located toward the image from the third lens group are respectively defined as B3t and Brt, decentering sensitivity TS3 of the third lens group at the telephoto end is given as follows:

$$TS3 = (1-B3t) \cdot Brt.$$

In the first embodiment, the decentering sensitivity is established to be within the proper range by selecting the absolute value of the TS3 so as to satisfy the following condition:

$$0.5 < |(1-B3t) \cdot Brt| < 3 \tag{1}.$$

If the value is less than the lower limit of the condition (1), the displacement of the third lens group is excessively large and in contrast if it exceeds the upper limit, the sensitivity becomes too large to control the vibration.

In order to improve the controllability further and reduce the displacement as well, it is preferable that the value range of the condition (1) be changed to satisfy the following condition (1a):

$$0.6<|(1-B3t)\cdot Brt|<2 \tag{1a}$$

(A-2) When it is defined that the focal length of the third lens group is f3 and the focal lengths of the entire system in the wide-angle end and the telephoto end are respectively fw and ft, it is preferable to satisfy the following conditions:

$$1.5<f3/fw<3.0 \tag{2}$$

$$2.0<ft/fw \tag{3}$$

When the value is less than the lower limit of the condition (2) so that the refracting power of the third lens group becomes excessively large, although it is advantageous for reducing the entire length, the Petzval sum excessively increases in the positive direction, so that correction of the distortion of the image plane is disadvantageously difficult. In contrast, when the value exceeds the upper limit, the displacement of the third lens group required for varying the magnification is disadvantageously increased.

When the value exceeds the condition (3), a predetermined zooming ratio cannot be obtained.

FIG. 4 is a schematic diagram of the arrangement of paraxial refracting powers of a variable power optical system according to a second embodiment of the present invention. In FIG. 4, the optical system comprises a first lens group L1 having a positive refracting power, a second lens group L2 having a negative refracting power, a third lens group L3 having a positive refracting power, and a fourth lens group L4 having a positive refracting power. The blurring of the captured image, produced when the entire optical system is vibrated (tilted), is corrected by shifting the second lens group L2 in the direction orthogonal to the optical axis. An iris SP is located in front of the third lens group L3. The image plane IP is located behind the fourth lens group L4.

Also, in the second embodiment, during a variation in magnification from a wide-angle end to a telephoto end, the second lens group L2 and the third lens group L3 are moved along the optical axis to vary the magnification, as shown by arrows. A rear focusing system is adopted, in which the fourth lens group L4 is moved along the optical axis for rear focusing.

Although it is disadvantageous in view of the lens diameter to perform vibration control by shifting the second lens group in comparison with the first embodiment, changes in the quantity of peripheral light during vibration control are reduced. The optical performance for vibration control is the same as that of the first embodiment shown in FIGS. 2A to 2D.

In the second embodiment, the first lens group L1 comprises a positive singlet lens or the combination of one positive lens and one negative lens. The structures of the second lens group L2 and the third lens group L3 are the same as those in the first embodiment.

In the second embodiment, excellent optical performance may be achieved in both the reference and vibration control states by satisfying the following condition.

(B-1) When the magnification at the telephoto end of the second lens group L2 and the lens groups located toward the image from the second lens group L2 are respectively defined as B2t and Brt, the sensitivity TS2 of the second lens group L2 during vibration control is given by:

$$TS2=(1-B2t)\cdot Brt.$$

In the second embodiment, it is preferable that the following absolute value satisfy the following condition:

$$0.5<|(1-B2t)\cdot Brt|<3 \tag{4}$$

When the value is less than the lower limit of the condition so that the sensitivity of the second lens group L2 is reduced, the displacement of the second lens group L2 during vibration control is disadvantageously increased. In contrast, when the value exceeds the upper limit so that the sensitivity is excessively increased, vibration control is disadvantageously difficult to be performed.

In the first and second embodiments, in order to maintain excellent optical performance in both the reference and vibration control states, it is preferable that at least one of the following conditions be satisfied.

(C-1) The second lens group L2 comprises, in order from an object, a negative meniscus lens having a concave surface facing the image side, a negative lens, and a positive lens having a convex surface facing the object.

(C-2) When the first lens group L1 comprises a positive singlet lens and the radii of curvature of the lens surfaces on the object side and the image side are respectively denoted by R1 and R2, and the Abbe number of the material of the first lens group is ν1, it is preferable that the following conditions be satisfied:

$$-3<(R1+R2)/(R1-R2)<0 \tag{5}$$

and $$55<\nu 1 \tag{6}$$

When the value is less than the lower limit of the condition (5), the spherical aberration is excessively increased in the negative direction at the telephoto end, and in contrast, when the value exceeds the upper limit, the correction of coma is disadvantageously difficult to be performed.

When the value is less than the lower limit of the condition (6), the correction of chromatic aberration on the optical axis, which is accompanied by a variation in magnification, is disadvantageously difficult to be performed. In addition, a numeral example 2 of the second embodiment will be described later.

FIG. 5 is a schematic diagram of the arrangement of paraxial refracting powers according to a third embodiment of the present invention. In FIG. 5, the optical system comprises a first lens group L1 having a positive refracting power, a second lens group L2 having a negative refracting power, a third lens group L3 having a positive refracting power, and a fourth lens group L4 having a positive refracting power. An iris SP is positioned in front of the third lens group L3. The image plane IP is behind the fourth lens group L4.

In the third embodiment, the image blurring produced when the entire optical system is vibrated (tilted) is corrected by shifting the third lens group L3 in a direction orthogonal to the optical axis.

In the third embodiment, during a variation in magnification from the wide-angle end to the telephoto end, the first lens group L1, the second lens group L2, and the third lens group L3 are moved along the optical axis, as shown by arrows. A rear focusing system is adopted, in which the fourth lens group L4 is moved along the optical axis for rear focusing.

During a variation in magnification from the wide-angle end to the telephoto end, the first lens group L1 and the third lens group L3 are moved toward the object while the second lens group L2 is moved toward the image plane IP at first and then is moved toward the object at some point during varying of the magnification.

The displacement of the third lens group L3 required for a variation in magnification is reduced by shifting the first lens group L1 toward the object, thereby enabling the entire length of the lens system at the wide-angle end to be reduced. The iris SP is moved together with the third lens group L3 toward the object; however, it may be independently moved when desired.

In the embodiment, focusing from an object at infinity toward an object at a short distance, for example, is performed by moving the fourth lens group L4 forward to the left, toward the object, as shown in the drawing.

In the third embodiment, in order to reduce the entire length of the lens system at the wide-angle end sufficiently, the following condition may be preferably satisfied:

$$0.2 < M1/M3 < 1.5 \quad (7)$$

wherein, the displacement of the first lens group required for a variation in magnification from the wide-angle end to the telephoto end is M1 and the displacement of the third lens group therefor is M3.

When the value is lower than the lower limit so as to reduce the displacement of the first lens group, reducing the entire length of the lens system cannot be sufficiently achieved. In contrast, when the value exceeds the upper limit so as to increase the displacement of the first lens group excessively, the mechanism for moving the first lens group is disadvantageously complicated.

Figure 6:
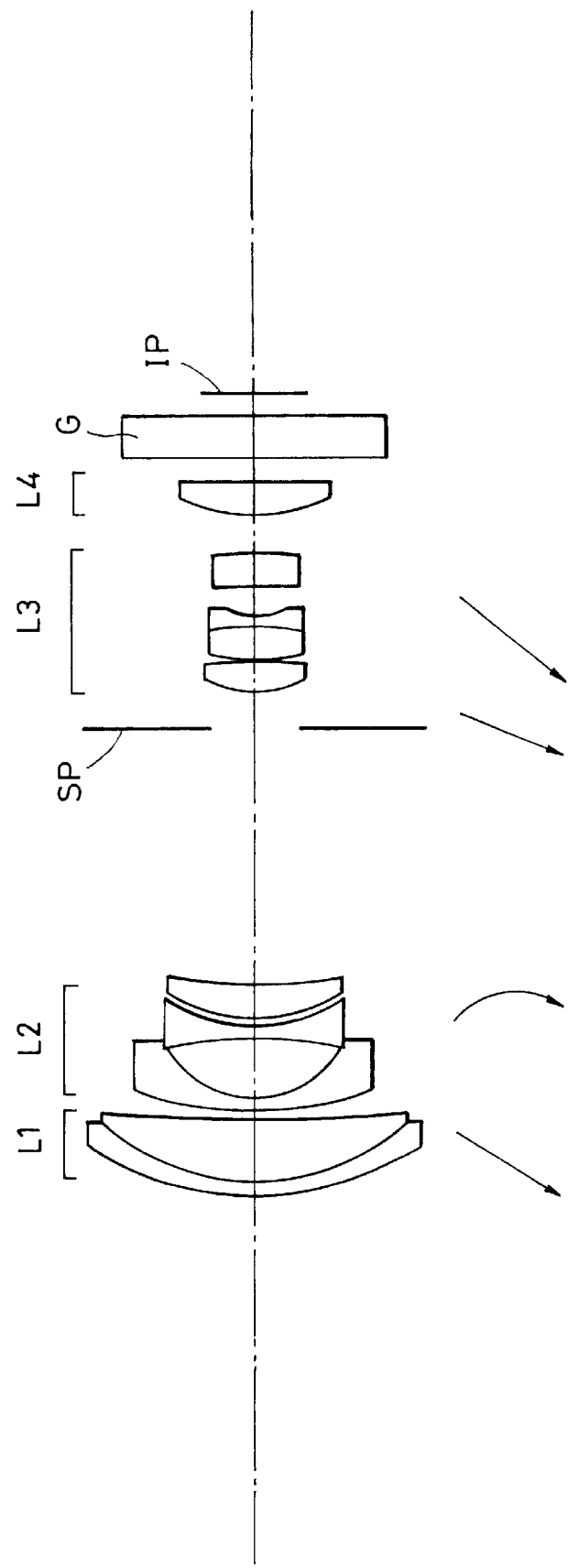
FIG. 6 is a sectional view of lenses at a wide-angle end of a third numerical example according to the present invention.

FIG. 6 shows a sectional view of lenses at the wide-angle end of a third numerical example according to the third embodiment. In the embodiment, the first lens group L1 comprises the combination of one positive lens and one negative lens, so as to reduce chromatic aberration of magnification on the optical axis produced in the first lens group L1, thereby improving changes in the chromatic aberration of magnification on the optical axis accompanied by a variation in magnification.

In addition, also in the third embodiment, the second lens group L2 may be formed of a negative meniscus lens having a concave surface facing the image side, a negative lens, and a positive lens having a convex surface facing the object. The iris SP, the third lens group L3, the fourth lens group L4, the optical element G, and the image plane IP are the same as in the first embodiment shown in FIG. 3.

Next, numerical examples according to the present invention will be shown. In each numerical example, the radius of curvature of the i-th surface in order from the object side is denoted by Ri; the space between the i-th surface and the (i+1)-th surface in order from the object is Di; and the refractive index and the Abbe number of the i-th optical member in order from the object are Ni and vi, respectively. The relationship between the above-mentioned conditions and the numerical examples is shown in Table 1.

When the direction of the optical axis is denoted by the X-axis; the direction orthogonal to the optical axis is denoted by the H-axis; the proceeding direction of light is the positive direction; the paraxial radius of curvature is denoted by R; and the respective aspherical factors are denoted by K, B, C, D, and E, the aspherical shape is represented by the equation of:

Numerals 1

$$X = \frac{(1/R)H^2}{1 + \sqrt{1 - (1+K)(H/R^2)}} + BH^4 + CH^6 + DH^8$$

NUMERICAL EXAMPLE 1 f = 1 to 2.97     Fno = 2.43 to 3.60     2ω = 64.2 to 23.9°

| | | | |
|---|---|---|---|
| R 1 = 3.333 | D 1 = 0.60 | N 1 = 1.516330 | v 1 = 64.1 |
| R 2 = 19.183 | D 2 = Variable | | |
| R 3 = 5.356 | D 3 = 0.13 | N 2 = 1.834000 | v 2 = 37.2 |
| R 4 = 1.141 | D 4 = 0.63 | | |
| R 5 = 13.107 | D 5 = 0.17 | N 3 = 1.658441 | v 3 = 50.9 |
| (Aspherical) | | | |
| R 6 = 1.939 | D 6 = 0.07 | | |
| R 7 = 1.838 | D 7 = 0.42 | N 4 = 1.846660 | v 4 = 23.8 |
| R 8 = 9.362 | D 8 = Variable | | |
| R 9 = iris | D 9 = 0.28 | | |
| R10 = 1.422 | D10 = 0.33 | N 5 = 1.834807 | v 5 = 42.7 |
| (Aspherical) | | | |
| R11 = −7.256 | D11 = 0.03 | | |
| R12 = 2.836 | D12 = 0.40 | N 6 = 1.834000 | v 6 = 37.2 |
| R13 = −1.997 | D13 = 0.12 | N 7 = 1.846660 | v 7 = 23.8 |
| R14 = 0.936 | D14 = 0.37 | | |
| R15 = −263.842 | D15 = 0.37 | N 8 = 1.772499 | v 8 = 49.6 |
| R16 = −4.052 | D16 = Variable | | |
| R17 = 1.447 | D17 = 0.36 | N 9 = 1.806100 | v 9 = 40.7 |
| (Aspherical) | | | |
| R18 = −74.627 | D18 = 0.29 | | |
| R19 = ∞ | D19 = 0.45 | N10 = 1.516330 | v10 = 64.1 |
| R20 = ∞ | | | |

| \ Focal Length<br>Variable Interval \ | 1.00 | 2.65 | 2.97 |
|---|---|---|---|
| D 2 | 0.09 | 1.19 | 1.07 |
| D 8 | 2.88 | 0.54 | 0.30 |
| D16 | 0.49 | 1.73 | 2.07 |

Aspherical Factor

R 5   k = −3.23868e + 02
      B = 4.34086e − 01    c = −3.26552e − 03    D = 1.45007e − 02
R10   k = 8.21638e − 01
      B = −2.15746e − 02   c = 1.56862e − 03     D = −9.29549e − 03
R17   k = −2.11938e − 01
      B = −3.62716e − 02   c = −8.77965e − 03    D = 0.00000e + 00

NUMERICAL EXAMPLE 2 f = 1 to 2.97     Fno = 2.48 to 3.60     2ω = 64.2 to 23.9°

| | | | |
|---|---|---|---|
| R 1 = 2.816 | D 1 = 0.60 | N 1 = 1.516330 | v 1 = 64.1 |
| R 2 = 11.896 | D 2 = Variable | | |
| R 3 = 6.390 | D 3 = 0.13 | N 2 = 1.834000 | v 2 = 37.2 |
| R 4 = 1.119 | D 4 = 0.63 | | |
| (Aspherical) | | | |
| R 5 = −4.480 | D 5 = 0.16 | N 3 = 1.650158 | v 3 = 39.4 |
| R 6 = 2.331 | D 6 = 0.04 | | |
| R 7 = 2.117 | D 7 = 0.42 | N 4 = 1.846660 | v 4 = 23.8 |
| R 8 = −18.814 | D 8 = Variable | | |
| R 9 = Iris | D 9 = 0.39 | | |
| R10 = 1.416 | D10 = 0.33 | N 5 = 1.834807 | v 5 = 42.7 |
| (Aspherical) | | | |
| R11 = −10.288 | D11 = 0.03 | | |
| R12 = 2.667 | D12 = 0.40 | N 6 = 1.834000 | v 6 = 37.2 |
| R13 = −1.997 | D13 = 0.12 | N 7 = 1.846660 | v 7 = 23.8 |
| R14 = 0.935 | D14 = 0.37 | | |
| R15 = −263.842 | D15 = 0.30 | N 8 = 1.603112 | v 8 = 60.6 |
| R16 = −4.052 | D16 = Variable | | |

-continued

| R17 = 1.881 (Aspherical) | D17 = 0.36 | N 9 = 1.806100 | ν 9 = 40.7 |
|---|---|---|---|
| R18 = −74.627 | D18 = 0.29 | | |
| R19 = ∞ | D19 = 0.45 | N10 = 1.516330 | ν10 = 64.1 |
| R20 = ∞ | | | |

| \ Focal Length Variable Interval \ | 1.00 | 2.65 | 2.97 |
|---|---|---|---|
| D 2 | 0.09 | 1.42 | 1.39 |
| D 8 | 2.84 | 0.54 | 0.30 |
| D16 | 0.22 | 1.26 | 1.56 |

Aspherical Factor

R 4  k = −1.09438e − 01
     B = −1.68564e − 02   C = 2.08890e − 02   D = −2.52790e − 02
R10  k = −6.69154e − 01
     B = −2.13385e − 02   C = 4.37738e − 03   D = −1.63567e − 02
R17  k = −1.09618e − 01
     B = −2.44913e − 02   C = 2.08869e − 03   D = 0.00000e + 00

NUMERICAL EXAMPLE 3 f = 1 to 4.00     Fno = 2.24 to 3.60     2ω = 64.2 to 17.8°

| R 1 = 3.588 | D 1 = 0.16 | N 1 = 1.834000 | ν 1 = 37.2 |
|---|---|---|---|
| R 2 = 2.680 | D 2 = 0.72 | N 2 = 1.603112 | ν 2 = 60.6 |
| R 3 = 28.984 | D 3 = Variable | | |
| R 4 = 4.182 | D 4 = 0.13 | N 3 = 1.834000 | ν 3 = 37.2 |
| R 5 = 1.207 | D 5 = 0.66 | | |
| R 6 = −5.965 | D 6 = 0.15 | N 4 = 1.583126 | ν 4 = 59.4 |
| R 7 = 1.819 | D 7 = 0.07 | | |
| R 8 = 1.769 | D 8 = 0.42 | N 5 = 1.846660 | ν 5 = 23.8 |
| R 9 = 6.817 | D 9 = Variable | | |
| R10 = Iris | D10 = 0.45 | | |
| R11 = 1.364 | D11 = 0.33 | N 6 = 1.834807 | ν 6 = 42.7 |
| R12 = −10.154 | D12 = 0.03 | | |
| R13 = 2.330 | D13 = 0.40 | N 7 = 1.834000 | ν 7 = 37.2 |
| R14 = −1.997 | D14 = 0.12 | N 8 = 1.846660 | ν 8 = 23.8 |
| R15 = 0.844 | D15 = 0.37 | | |
| R16 = −9.752 | D16 = 0.37 | N 9 = 1.772499 | ν 9 = 49.6 |
| R17 = −4.788 | D17 = Variable | | |
| R18 = 2.027 (Aspherical) | D18 = 0.36 | N10 = 1.806100 | ν10 = 40.7 |
| R19 = −74.627 | D19 = 0.29 | | |
| R20 = ∞ | D20 = 0.45 | N11 = 1.516330 | ν11 = 64.1 |
| R21 = ∞ | | | |

| \ Focal Length Variable Interval \ | 1.00 | 3.36 | 4.00 |
|---|---|---|---|
| D 3 | 0.09 | 1.95 | 2.06 |
| D 9 | 2.96 | 0.60 | 0.36 |
| D17 | 0.45 | 1.99 | 2.43 |

Aspherical Factor

R 6  k = 1.76310e + 01
     B = 1.81049e − 02   C = −4.77367e − 03   D = 4.50945e − 03
R11  k = −8.70146e − 01
     B = −1.25504e − 02  C = 4.92439e − 03   D = −1.44314e − 02
R18  k = −1.10607e − 02
     B = 4.79091e − 03   C = −5.01469e − 04  D = 0.00000e + 00

TABLE 1

| | Numerical Examples | | |
|---|---|---|---|
| Conditions | 1 | 2 | 3 |
| (1)\|(1−B3t) · Brt\| | 1.718 | 1.421 | 1.454 |
| (2)f3/fw | 2.150 | 2.285 | 2.338 |
| (3)ft/fw | 2.968 | 2.967 | 4.000 |

TABLE 1-continued

| | Numerical Examples | | |
|---|---|---|---|
| Conditions | 1 | 2 | 3 |
| (4)\|(1−B2t) · Brt\| | ... | 1.177 | ... |
| (5)(R1+R2)/(R1−R2) | −1.421 | −1.620 | ... |
| (6)ν 1 | 64.1 | 64.1 | ... |
| (7)M1/M3 | ... | ... | 0.604 |

Figure 16A:
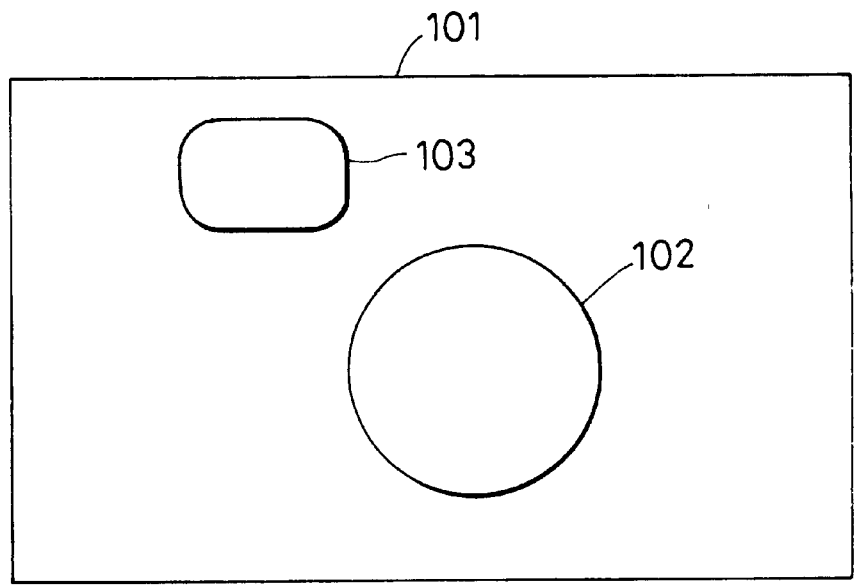
FIGS. 16A and 16B show an image pick-up apparatus using the variable power optical system according to the first to the third embodiment of the present invention.
Figure 16B:
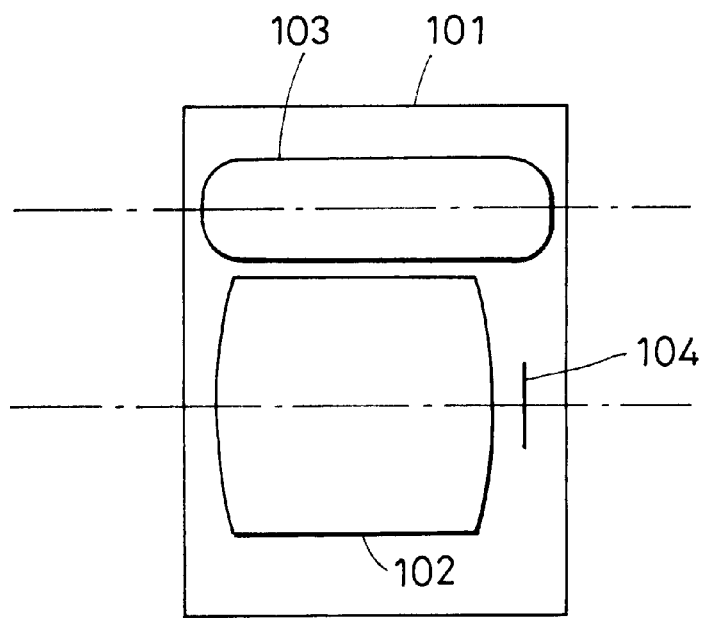

In FIGS. 16A and 16B, an image pick-up apparatus using the variable power optical system according to the first to the third embodiment of the present invention is shown, wherein FIG. 16A is a front view of the image pick-up apparatus and FIG. 16B is a sectional side elevation thereof. The image pick-up apparatus comprises an apparatus body (casing) 101, an image pick-up optical system 102 using any one of the variable power optical systems according to the first to third embodiments, a finder optical system 103, and an image pick-up element 104, such as a CCD. In such a manner, a compact image pick-up apparatus can be achieved by applying the variable power optical system according to the first to the third embodiment to the image pick-up optical system of the image pick-up apparatus.

As described above, the variable power optical system according to the present invention is formed so that the image blurring produced when the optical system is vibrated (tilted) is corrected by shifting a comparatively small-sized and lightweight lens group forming a part of the optical system in a direction orthogonal to the optical axis while the lens group for correcting the image blurring is properly formed, thereby achieving a variable power optical system and the image pick-up apparatus that have the vibration control function having the properly corrected decentering aberration produced when the lens group is decentered so as to enable the optical system sufficiently to cope with digital still cameras each having an image pick-up element including one million or more pixels, for example, and also simultaneously achieving miniaturizing of the entire apparatus and simplification in the mechanism.

While the present invention has been described with reference to what are presently considered to be the preferred embodiments, it is to be understood that the invention is not limited to the disclosed embodiments. In contrast, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A variable power optical system comprising, in order from an object side:

a first lens unit having a positive refracting power and consisting of one of (a) a positive singlet lens or (b) the combination of one positive lens and one negative lens;

a second lens unit having a negative refracting power;

a third lens unit having a positive refracting power; and a fourth lens unit having a positive refracting power, wherein at least the second lens unit and the third lens unit are moved during variation of magnification, and an image is displaced by shifting any one of the entire second lens unit and the entire third lens unit so as to have a component in a direction orthogonal to the optical axis, and wherein the third lens unit consists of, in order from the object side, a positive lens, a bonded lens, and a positive lens.

2. A variable power optical system according to claim 1, wherein when the image is displaced by shifting the entire third lens unit so as to have a component in the direction orthogonal to the optical axis, the optical system satisfies the condition:

$$0.5<|(1-B3t)\cdot Brt|<3,$$

wherein the magnification at a telephoto end of the third lens unit is B3t and the magnification at a telephoto end of the lens unit or lens units, if there are more than one, of the optical system that are disposed toward the image from the third lens unit is Brt.

3. A variable power optical system according to claim 1, wherein when the image is displaced by shifting the entire second lens unit so as to have a component in a direction orthogonal to the optical axis, the optical system satisfies the conditions:

$$1.5<f3/fw<3.0;$$

and $$2.0<ft/fw;$$

wherein the focal length of the third lens unit is f3, the focal length of the entire system at a wide-angle end is fw, and the focal length of the entire system at a telephoto end is ft.

4. A variable power optical system according to claim 1, wherein when the image is displaced by shifting the entire second lens unit so as to have a component in a direction orthogonal to the optical axis, the optical system satisfies the condition:

$$0.5<|(1-B2t)\cdot Brt|<3,$$

wherein the magnification at a telephoto end of the second lens unit is B2t and the magnification at the telephoto end of the lens units of the optical system that are disposed toward the image from the second lens unit is Brt.

5. A variable power optical system according to claim 1, wherein the bonded lens consists of a positive lens and a negative lens having a concave surface facing the image side.

6. A variable power optical system according to claim 5, wherein the positive lens disposed closest to the object side in the third lens unit is an aspherical lens.

7. A variable power optical system according to claim 1, wherein the second lens unit consists of, in order from the object side, a negative meniscus lens having a concave surface facing the image side, a negative lens, and a positive lens having a convex surface facing the object side.

8. A variable power optical system according to claim 1, wherein the first lens unit consists of a positive singlet lens and satisfies the conditions:

$$-3<(R1+R2)/(R1-R2)<0;$$

and $$55<v1,$$

wherein the radius of curvature of the lens surface at the object side of the positive singlet lens is R1, the radius of curvature of the lens surface at the image side thereof is R2, and the Abbe number of the material thereof is v1.

9. An image pick-up apparatus comprising:
a variable power optical system according to claim 1;
a casing for holding said variable power optical system; and
an image pickup element, supported by said casing and positioned to receive light from said variable power optical system.

10. A variable power optical system comprising, in order from an object side:
a first lens unit having a positive refracting power and consisting of one of (a) a positive singlet lens or (b) the combination of one positive lens and one negative lens;
a second lens unit having a negative refracting power;
an aperture stop;
a third lens unit having a positive refracting power; and
a fourth lens unit having a positive refracting power,
wherein at least the second lens unit, the aperture stop, and the third lens unit move during zooming, and an image is displaced by shifting any one of the entire second lens unit and the entire third lens unit so as to have a component in the direction orthogonal to the optical axis, and
wherein the third lens unit comprises, in order from the object side, a positive lens and a bonded lens.

11. An image pick-up apparatus comprising:
a variable power optical system according to claim 10;
a casing for holding said variable power optical system; and
an image pickup element, supported by said casing and positioned to receive light from said variable power optical system.

12. A variable power optical system according to claim 10, wherein a bonded surface of the bonded lens forms a convex shape facing the image side.

13. A variable power optical system according to claim 10, wherein the first lens unit moves during zooming.

14. A variable power optical system according to claim 13, wherein the optical system satisfies the condition $$0.2<M1/M3<1.5,$$

wherein the displacement of the first lens unit during zooming from a wide-angle end to a telephoto end is M1 and the displacement of the third lens unit during zooming from a wide-angle end to a telephoto end is M3.

15. A variable power optical system according to claim 10, wherein when the image is displaced by shifting the entire third lens unit so as to have a component in the direction orthogonal to the optical axis, the optical system satisfies the condition:

$$0.5<|(1-B3t)\cdot Brt|<3,$$

wherein the magnification at a telephoto end of the third lens unit is B3t and the magnification at a telephoto end of the lens unit or lens units, if there are more than one, of the optical system that are disposed toward the image from the third lens unit is Brt.

16. A variable power optical system according to claim 10, wherein when the image is displaced by shifting the entire second lens unit so as to have a component in a direction orthogonal to the optical axis, the optical system satisfies the condition:

$$0.5<|(1-B2t)\cdot Brt|<3,$$

wherein the magnification at a telephoto end of the second lens unit is B2t and the magnification at the telephoto end of the lens units of the optical system that are disposed toward the image from the second lens unit is Brt.

* * * * *

UNITED STATES PATENT AND TRADEMARK OFFICE
CERTIFICATE OF CORRECTION

PATENT NO. : 6,650,475 B1
DATED : November 18, 2003
INVENTOR(S) : Hiroyuki Hamano It is certified that error appears in the above-identified patent and that said Letters Patent is hereby corrected as shown below:

Column 12,
Lines 40, 42 and 44, "c" should read -- C --.

Signed and Sealed this

Twentieth Day of April, 2004

JON W. DUDAS
*Acting Director of the United States Patent and Trademark Office*